United States Patent
Agarwal et al.

(10) Patent No.: US 10,242,050 B2
(45) Date of Patent: Mar. 26, 2019

(54) DATABASE CACHING IN A DATABASE SYSTEM

(71) Applicant: SYBASE, INC., Dublin, CA (US)

(72) Inventors: Prateek Agarwal, Pune (IN); Vaibhav Nalawade, Pune (IN)

(73) Assignee: SYBASE, INC., Dublin, CA (US)

( * ) Notice: Subject to any disclaimer, the term of this patent is extended or adjusted under 35 U.S.C. 154(b) by 365 days.

(21) Appl. No.: 15/070,355

(22) Filed: Mar. 15, 2016

(65) Prior Publication Data
US 2017/0185645 A1 Jun. 29, 2017

(30) Foreign Application Priority Data

Dec. 23, 2015 (IN) .......................... 6847/CHE/2015

(51) Int. Cl.
*G06F 17/30* (2006.01)
*G06F 12/0875* (2016.01)

(52) U.S. Cl.
CPC .... *G06F 17/30457* (2013.01); *G06F 12/0875* (2013.01); *G06F 17/3048* (2013.01); *G06F 17/30097* (2013.01); *G06F 17/30132* (2013.01); *G06F 2212/222* (2013.01); *G06F 2212/60* (2013.01)

(58) Field of Classification Search
CPC .......... G06F 12/0871; G06F 17/30371; G06F 17/30575; G06F 17/30958; G06F 17/30132; G06F 17/30368; G06F 17/3048
USPC ......... 707/717, 634, 809, 812; 711/129, 147
See application file for complete search history.

(56) References Cited

U.S. PATENT DOCUMENTS

| | | | | |
|---|---|---|---|---|
| 9,229,864 B1 * | 1/2016 | Kanteti | ............... | G06F 12/0808 |
| 9,495,301 B2 * | 11/2016 | Gross | ................. | G06F 12/0893 |
| 9,519,676 B1 * | 12/2016 | Finnie | ............... | G06F 17/30377 |
| 9,645,932 B1 * | 5/2017 | Bono | ................. | G06F 12/0833 |
| 9,842,031 B1 * | 12/2017 | Kharatishvili | ...... | G06F 11/1474 |
| 9,880,933 B1 * | 1/2018 | Gupta | ................. | G06F 12/0815 |
| 9,898,498 B2 * | 2/2018 | Tuatini | ............. | G06F 17/30371 |
| 2014/0172827 A1 * | 6/2014 | Nos | ................... | G06F 17/30424 |
| | | | | 707/722 |
| 2016/0147748 A1 * | 5/2016 | Florendo | ............... | G06F 17/303 |
| | | | | 707/809 |

* cited by examiner

*Primary Examiner* — Dangelino N Gortayo
(74) *Attorney, Agent, or Firm* — Buckley, Maschoff & Talwalkar LLC

(57) ABSTRACT

A database system provides a non-volatile cache memory layer for caching pages for a set of database from the database system. The non-volatile cache memory layer may include a non-volatile cache for caching pages for a database from the set of database on the database system. The non-volatile cache may be configured through invoking a configuring stored procedure persistent on the database system. A request is received at the non-volatile cache memory layer for performing an operation on a page from the database on the database system. Based on the received request and an identification of the page, a caching operation is performed on the non-volatile cache memory layer. The caching operation is associated with the request. Data associated with the requested operation on the page is stored and organized on the NV cache memory layer.

17 Claims, 19 Drawing Sheets

DATABASE CACHING IN A DATABASE SYSTEM

RELATED APPLICATIONS

The present patent application claims the priority benefit of the filing date of Indian Provisional Application No. 6847/CHE/2015, filed 23 Dec. 2015, titled "NON-VOLATILE CACHE MEMORY STORAGE", the contents of which is incorporated herein by reference in its entirety.

TECHNICAL FIELD

The field generally relates to database systems, data processing and database caching.

BACKGROUND

Applications may be developed and deployed on multi-tier environments, which include application tiers, runtime environments, and back-end databases. Application tiers and database tiers communicate while applications perform tasks related to provided functionality. A database tier is used for storing data. A middle tier for database caching may be an effective approach to achieve scalability and performance. Cache memory provides in-memory storage and management of data. The cache memory may be a random access memory (RAM) that a computer processor can access more quickly in comparison to accessing regular hard disk drives. The cache memory is a component that stores data, which may be used for future requests. Data requests may be served faster through the cache memory. The data stored in the cache memory may be a result of an earlier performed computation, a duplicate of previously requested data, etc. Data is organized in the cached memory into data regions, which may be configured. The cache memory may also provide functionality such as transactions, data querying, disk storage management, and logging.

BRIEF DESCRIPTION OF THE DRAWINGS

The embodiments are illustrated by way of examples and not by way of limitation in the figures of the accompanying drawings in which like references indicate the same or similar elements. The example embodiments may be best understood from the following detailed description taken in conjunction with the accompanying drawings.

DETAILED DESCRIPTION

Figure 1:
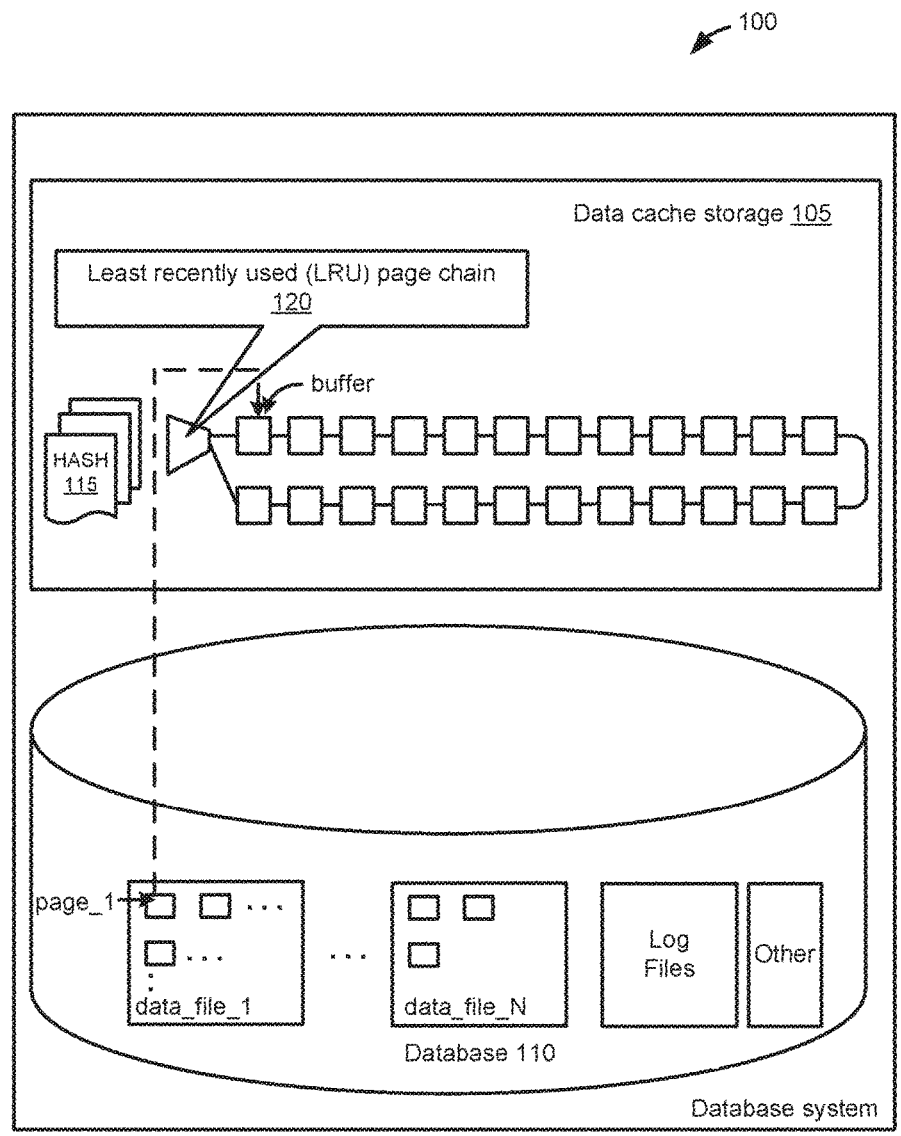
FIG. 1 is a block diagram illustrating a database system, which defines database caching, according to an example embodiment.

Example embodiments of techniques to perform database caching on a non-volatile (NV) cache memory layer for a database system are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

An application may be developed and designed in a multi-tier architecture, where the application's presentation, logic and data management functions are physically separated. For example, the application's logic and the data tier may run on different hosts. While the application is running and serving requests through providing implemented functionality, transactions are generated. Based on the number of performed transactions, the application's throughput is defined. The throughput may be affected by the speed of the network, which is used for communication between the different tiers of the application. Network overhead may be at least partially avoided by having persisted data at the application tier.

A cache memory tier may be included to store data from the database tier. The database tier includes an organized collection of information, which can be retrieved and operated upon. The database tier may comprise a collection of schemas, tables, queries, reports, views, and other objects. For example, the information in relational databases is presented in tables with rows and columns. Tables include defined relations for a collection of objects of the same type (e.g. rows).

The fundamental unit of a data storage in a database system is the page. The part of the data storage in a database system allocated to a data file, is logically divided into pages. Pages may be numbered contiguously from 0 to n. A page is defined with a specific page size, for example, 8 kilobytes (KB). Each page may begin with a header that is used to store system information about the page. This information includes the page number, page type, the amount of free space on the page, and the allocation unit identifier (ID) of the object that owns the page. Database pages are an internal basic structure to organize data in the database files within the database system. The files are logically concatenated to form a table space in the database. The table space consists of database pages with a specified size. The pages may be grouped. The database system may read and/or write whole data pages.

A database system may include hardware modules and software modules for persisting and managing data within databases. The database system may be associated with a database management system (DBMS). The DBMS is a computer system for managing databases. The DBMS is available for user interactions and also interacts with other applications and systems. A given DBMS may be designed to allow defining, creating, querying, updating, and administering a number of databases. A DBMS may serve several databases. These databases may be associated with software applications for persisting data, which data may be used by applications' logic.

FIG. 1 is a block diagram illustrating a database system, which defines database caching, according to an example embodiment. For a given application, data persisted in a database layer may be accessed by an application logic layer. Exchange of data and information may be performed. A main memory cache storage may be used for enhancing (for example, optimizing) performance of the application and for data management. A main memory cache storage may be used for database caching. A buffer management process may be defined for the application. A default memory cache storage may be specified in the buffer management process. Additional main memory cache storages may be further defined based on user preferences. For example, cache storages may be defined statically by specifying details in configuration files for the database system. The definition of cache storages may also be performed through executing a stored procedure in the databases. For the defined cache storages, a default size for a server page that may be included in the cache storages may be determined. Additional user-defined pools can be added statically through adjustments in the configuration files for the database system before running the application, or dynamically with a stored procedure executed in the database system.

In an example embodiment, for a database system 100, a data cache storage 105 is defined, which is associated with a database 110. When pages from the database 110 are accessed, the pages are cached in the data cache storage 105. Caching of pages may be defined to correspond to particular objects from the database system 100, e.g. databases, tables, indexes, logs, etc. A number of cache storages, including the data cache storage 105, may be bound correspondingly to such objects from the database system 100. In such manner, the access pattern of a particular object is isolated from the other objects, which are cached in the cache storages.

In an example embodiment, the data cache storage 105 may be optimized to be accessible only for a particular bound object, for example the database 110. The database 110 includes a number of data files, log files, other data. The data files from the database 110 include a number of pages storing the content in the database 110. The data files in the database 110 are shown by way of example to include data_file_1 through data_file_N.

In one embodiment, page_1 is part of data_file_1 on database 110 on the database system 100. Page_1 resides on a disk storage of the database 110. An application stores data on the database 110 and such data may be invoked from the database 110. For example, data may be requested through a user interface (UI) of the application, which data is persisted on the database 110. The data cache storage 105 comprises a hash table 115 and a chain 120 including a number of buffers for storing accessed pages from the database 110.

In one embodiment, the requested data is included in "page_1" on data_file_1 stored on the database 110. First, the data cache storage 105 is searched to find if that page is persisted in the cache. "Page_1" may be persisted in the data cache storage 105 if the same page was previously invoked from the database 110 and a read and/or write operation is performed. If "Page_1" was never accessed and only resides on the disk, then the search in the data cache storage will not find the page—"Page_1". Then in the data cache storage 105 a buffer is made vacant and the requested page—"Page_1", is read into the data cache storage 105. The identity of the page is registered in the hash table 115 for the data cache storage 105. Once "Page_1" is brought in the data cache storage 105, it remains in the data cache storage 105 until there are frequent accesses to "Page_1".

The chain 120 links a number of buffers to refer to accessed pages from the database 110. The chain 120 may be a least-recently used (LRU) chain that orders the buffers in a decreasing order of time lapsed since a time stamp identifying a latest accessing of the page persisted into the buffer. The chain 120 may also be defined in an increasing order of time lapsed since the time stamp identifying the latest access of the pages persisted in the chain 120. The end of the chain 120, which has the most recently accessed buffers, may be denoted as most-recently used (MRU) end. The LRU end of the chain 120 has the least recently accessed buffers.

Further, the chain 120 may be defined to be a strict LRU chain. In such manner, the frequency of access is strictly followed to always link the last accessed buffer to the MRU end of the chain. The buffers slowly decay to the LRU end before they are selected for replacement. The chain 120, on the other hand, may also be defined as a relaxed LRU chain. When the chain 120 is a relaxed LRU chain, then the frequency of access is not strictly followed and buffers which are less used get replaced, however it necessarily may not be the least used.

In one embodiment, cache storages, such as the data cache storage 105 in the database system 100 may be created, dropped, and/or updated dynamically. Objects from databases in the database system 100 (such as the database 110) may be bound to particular cache storages. Such objects may be databases, tables from databases, indexes for database, log files from databases, etc.

Figure 2A:
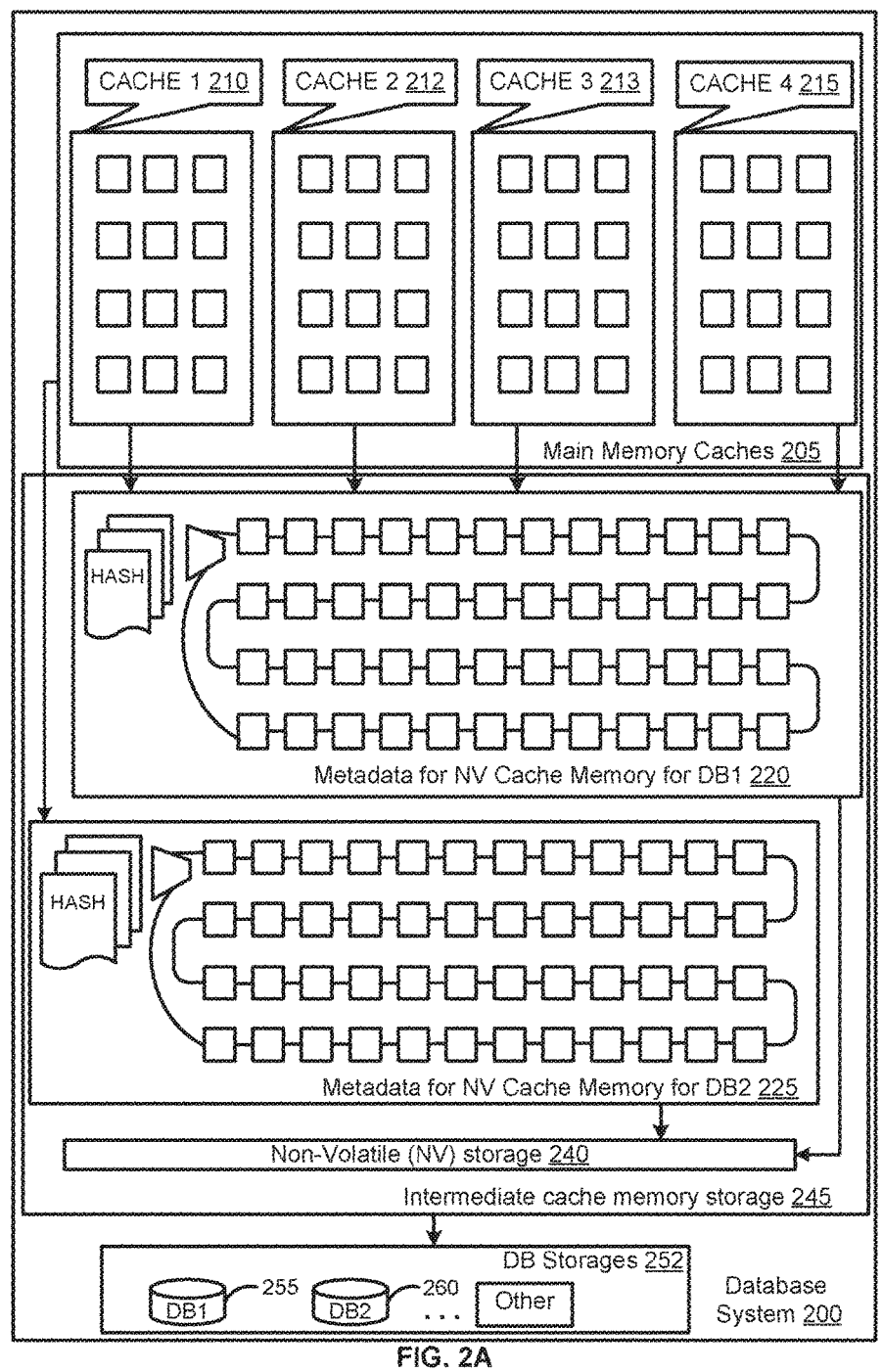
FIG. 2A is a block diagram illustrating a database system providing a main memory cache storage and a non-volatile (NV) cache memory storage, according to an example embodiment.

FIG. 2A is a block diagram illustrating a database system 200 providing a main memory caches 205 and an intermediate cache memory storages 245, according to an example embodiment. In one embodiment, an exemplary architectural system structure is suggested, where an intermediate layer, presented by the intermediate cache memory storages 245, is provided between the main memory caches 205 and the database storages 252. The new design structure allows a loose coupling between the main memory caches and the intermediate cache memory storages 245. The intermediate cache memory storages 245 may be in-memory cache storages stored on volatile and non-volatile disk storages. The main memory caches 205 define a cache area of memory within servers provided by the database system 200. The cache area contains in-memory images of database pages, together with data structures required for managing the pages. The main memory caches 205 include cache storages that comprise buffers for caching pages. The main memory caches 205 may be partitioned to reduce contention on cache spinlock. Each cache partition can be synchronized autonomously.

Classification of Pages when Storing NV Metadata

Pages that are cached into the main memory cache are associated with requests for accessing the pages in the cache. Cached pages in the main memory cache are transferred to the corresponding NV cache. In one embodiment, a monitoring algorithm may be provided for monitoring cached pages that are frequently accessed. When a page is being accessed in relation to a read operation for a number of times, and/or when the page is changed, the page may be marked as qualified in the NV metadata to be added to the NV cache. Pages that are frequently requested and accessed may be classified as "warm" pages. Those of the "warm" pages that are most frequently accessed may be classified as "hot" pages. Pages that are least frequently accessed are not "warm" and they may be classified as "cold", and may be defined as "cold" pages. As the "warm" pages are highly probable to be required again, having them cached on a cache storage with a higher accessing speed is beneficial.

The NV cache storage provides high accessing speed, therefore frequently accessed pages benefit from being stored on NV storages, e.g. solid-state disk drive devices. Thus, the NV cache may be used for caching the "warm" pages. The warmth of a page may be defined as the number of times when the page is correspondingly requested and accessed from the NV cache. The warmth of a page may be stored as a warm count associated with the page. The warm count may be equal to the number of times the page is accessed from the NV cache. The warmth of the pages for eviction to the NV cache can be configured. All the pages in the main memory cache may be configured to be evicted to the NV cache by in a decreasing order based on the warm counts stored correspondingly for the pages. In another example, the configuration for evicting pages to the NV cache may be defined more restrictive by increasing the warm count.

The intermediate cache memory storages 245 may be introduced as a buffer management mechanism. The DB storages 252 include a set of databases, such as DB1 255, DB2 260, etc. The intermediate cache memory storages 245 may be defined correspondingly for the databases from the DB storages 252 on the database system 200. The intermediate cache memory storages 245 may be defined with a particular size.

The non-volatile cache memory sections defined in the intermediate cache memory storages 245 include a set of non-volatile caches designated per database from the set of databases in the DB storage 252. For example, the non-volatile cache memory storages 245 include non-volatile cache memory storages assigned correspondingly to the databases in the DB storages 252. Therefore, the non-volatile caches in the intermediate cache memory storages 245 are defined per database. The non-volatile storages from the intermediate cache memory storages 245 are extensions to the main memory caches 205 on a non-volatile (NV) storage 240. The NV storage 240 may be on a solid-state drive (SSD) device. The SSD is also known as a solid-state disk, which is a solid state storage device that uses integrated circuit assemblies as memory to persist stored data. The NV storage 240 may be a on a storage device containing non-volatile flash memory, used as an alternative to a hard disk. The NV storage 240 provides high speed for performing transactions and transferring information.

In one embodiment, the intermediate cache memory storages 245 may have whole database(s)/table(s)/indexes/log(s) of a database system bound correspondingly to the storages 245. A number of cache storages from the main memory cache 205 may be extended on a single non-volatile cache storage from the intermediate cache memory storage 245. Additionally, a single cache storage from the main memory cache 205 may extend on a number of non-volatile cache memory storages from the intermediate cache memory storages 245.

The intermediated cache memory storages 245 are independent of the main memory caches 205. In such manner, the intermediate cache memory storages 245 exist and persist data after reboots of the database system 200. However, the main memory caches 205 do not survive reboots and are set clean after a reboot. The intermediated cache memory storages 245 may be used during a recovery process if a system failure is recorded. However, the main memory caches may be used to read pages stored on the intermediate cache memory storages 245 during a recovery process. The main memory caches 205 may be also be used to write pages. An NV cache memory storage from the intermediate cache memory storages 245 may be dropped dynamically. Further, NV cache storages may be bound, dropped, and added. Characteristics of stored pages in the NV cache storages may be preserved. Thus the NV cache configuration can be changed dynamically, but the persistence of the NV storage can be preserved and reused.

When the intermediate cache memory storages 245 are introduced as an intermediate layer between the main memory caches 205 and the DB storages 252 in a database system 200, general rules for caching data may be applied. The general rules may include regulations for writing data from the main memory caches 205 to the intermediate cache memory storages 245. For example, the cache management may define that content cached and stored on the main memory caches 205 may be first transferred on the NV storage 240. The content stored on the main memory caches 205 may be stored with a write operation performed in relation to data requested from the DB storages 252. The write operation to the NV storage 240 may be performed before a write operation that transfers the content from the main memory caches 205 to the DB storages 252.

In one embodiment, when content is stored in the main memory cache 205, a new page or an update to a page may be performed on a cache storage, such as cache_1 210, cache_2, 212, cache_3 213, and cache_4 215. For example, cache_1 210 may be associated with a particular database, such as DB2 260. Also, cache_1 210 may be associated with DB1 255, for example, with a given table from DB1 255. Further, tables of a database, such as DB1 255 may be bound to multiple cache storages, such as cache_1 210, cache_2 212, cache_3 213, and cache_4 215.

The indexes of a database can be found on different cache storages. In such case, all of the cache storages may be extended on one and the same intermediate storage, respectively the NV storage 240 from the intermediated cache memory storages 245. Also, two or more databases can be bound to a cache storage from the main memory caches 205. In one example, the DB2 260 from the DB storages 252 may be bound to the main memory cache storage—cache_1 210, from the main memory cache 205. An NV cache from the intermediate cache memory storages 245 may be configured for DB2 260. For example, NV cache for DB2 260 may comprise metadata, such as metadata for NV cache memory for DB2 225 and a cache storage part on the NV storage 240. In such manner, cache_1 210 may be extended on the intermediate cache memory storages 245.

When tables of a database are bound to a particular cache storage from the main memory caches 205, then allocations and/or de-allocations of pages between cache storages from the main memory caches 205 are possible. The intermediated cache memory storages 245 are common for the databases of the DB storages 252 and shifting of pages does not reflect allocation on storages in the NV storage 240.

In one embodiment, the main memory caches 205 comprise a set of cache memory storages including a number of buffers in a buffer pool for caching pages related to data requested from corresponding databases to the cache memory storages. The buffer pool may be an area of memory within the main memory caches 205, which contains sized buffers that are linked together into a chain. Pages from the main memory caches 205 may be evicted as a result from a received request related to data from a database part of the DB storages 252. Frequently read pages (e.g., read more than once) may be transferred from the main memory caches 205 to the NV cache 240, when evicted frequently from the main memory caches 205. When a page from a buffer in a cache store from the main memory caches 205 is evicted, the page may be cached on a corresponding buffer area on a corresponding NV cache, from the intermediate cache memory storages 245. Within a given NV cache, there are chains of buffers where pages are written when evicted from the main memory caches 205.

In one embodiment, the pages that are stored on the intermediated cache memory storages 245 may be maintained by in-memory metadata structures part of the intermediate cache memory storages 245. The in-memory metadata structures may define hash tables and buffer headers corresponding to headers of buffers from cache storages in the main memory caches 205. The NV cache memory storages in the intermediate cache memory storages 245 may comprise metadata correspondingly defined for the main caches. A page layout of a page persisted on the NV cache storage 240 from the intermediate cache memory storage 245 may be reconstructed by reading in the metadata structures.

In one embodiment, the intermediate cache memory storages 245 may be designed to keep data on a non-volatile disk space and to maintain certain metadata in-memory. The metadata may be used to locate where the kept data is positioned, to synchronize access to the data, and to manage the stored data. An NV cache memory storage from the intermediate cache memory storages 245 may be defined for a particular database from the database system 200. The NV cache memory storage for DB1 255, which is stored on the intermediate cache memory storage 245, may include metadata for NV cache memory for DB1 220 for cached pages on the NV storage 240. The NV cache memory storage for DB2 260, stored on the intermediate cache memory storage 245, also includes metadata for NV cache memory for DB2 225. The NV cache storage defined for DB1 255 may further include actual content of cached pages stored on the NV storage 240.

The metadata 220 and metadata 225 may include information for stored content on the intermediate cache memory storage 245. The stored information about cached pages may include definitions of chains that link buffers associated correspondingly with cached pages. Defined chains may be associated with those of the pages from a particular DB that are cached and may be organized according to specific criteria. Different chains may link buffers comprising information corresponding to different cached pages on the intermediated cache memory storage 245. The buffers in the different chains may follow different order. Based on such chains, the information about the cached pages may be searched and optimized access to cached content may be provided. The metadata 220 may include a hash chain defined for the NV cache memory for DB1.

The metadata 220 may also include a page replacement chain, for example, an LRU chain, which orders the buffers in the chain according to the most recent and frequently accessed cached pages associated correspondingly with the buffers linked in the chain. Further details about different chains maintained in metadata for NV cache memory are provided below.

Figure 2B:
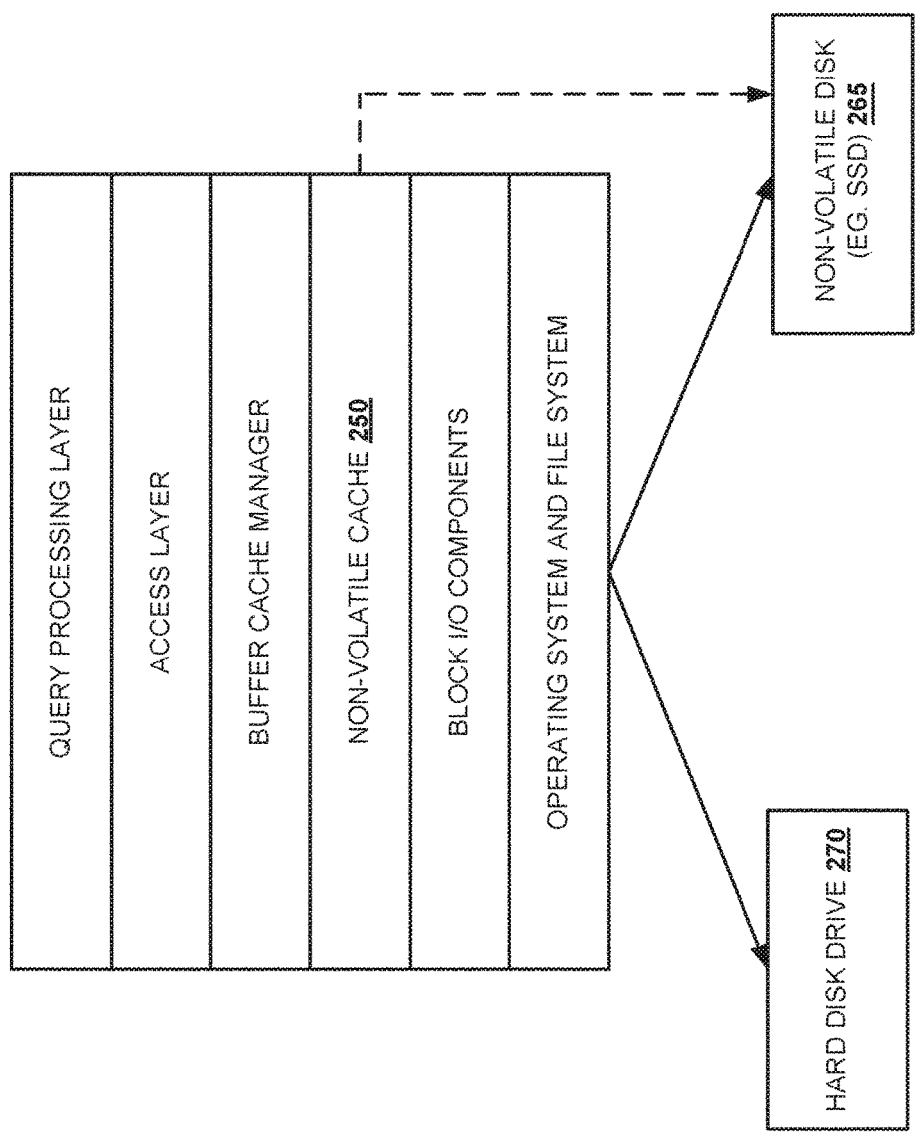
FIG. 2B is a block diagram illustrating an exemplary architecture of a DBMS introducing an NV cache memory storage as an intermediate layer for caching data, according to an example embodiment.

FIG. 2B is a block diagram illustrating an exemplary architecture of a database system introducing an NV cache memory storage as an intermediate layer for caching data, according to an example embodiment. In one embodiment, NV cache 250 is an intermediate layer between a buffer cache manager layer and operating systems and file systems. Though the operating systems and files systems, cached content is stored on a hard-disk drive (HDD) 270. When caching associated with data in pages of a database are performed in a database system, a buffer cache manager may be used. The non-volatile cache 250 includes metadata related to cached pages. The metadata may define a location for determining a position on a NV disk 265, where cached content of pages is stored. The NV disk 265 storage, which is used for physical caching data pages may be a Solid State Device (SSD) drive.

In one embodiment, the NV cache 250 is an extended main memory cache. The NV cache 250 is an intermediate, persistent, write-back cache layer. The NV cache 250 is an intermediate cache because it provides additional layer of caching between buffer caches (or main memory caches) and hard disk storage (e.g., hard-disk drive 270) for content associated with a database. The cached content is persistent due to usage of the non-volatile disk 260. There are write-back cache procedures defined. Data written on the NV cache 250 is persistent and it is written back to the HDD 270 in a delayed manner.

In one embodiment, a change in the architecture of the database system, when the intermediate layer of the NV cache 250 is introduced, affects the buffer change manager layer and the Block Input/Output components. Block I/O components provide application programming interfaces (APIs) to perform input and output transactions in blocks of server page sizes. Existing exposed APIs, may be reused by the NV cache 250. The NV cache 250 manages the cached pages on the non-volatile disk 260 device.

Buffer cache manager provides caching of data pages in memory of the database system. Based on a caching algorithm of the buffer cache manager, a page is determined whether to be added to the NV cache 250 or not. The introduction of the NV cache 250 does not affect the access layer to data of the database. The access layer may not interact directly with the NV cache 250 layer, but it may provide input for a caching mechanism utilized by the NV cache 250. No change may be done in the access layer or access layer's interface with the buffer cache manager layer.

The buffer cache manager layer may also be a main memory cache layer. The buffer cache manager layer and the NV cache 250 layer interact internally on page level when a particular event occurs. For example, an event that may trigger interaction between the buffer cache manager and the NV cache 250 may be a request associated with a page. The request may be for reading the page, when the page is not present in Buffer cache manager. The page may be requested to be read through the query processing layer and may be accessed through the access layer. Another example of an event that may trigger interaction between the buffer cache manager and the NV cache 250 may be that contents of a page in the buffer cache manager is changed and the changed contents have to be persisted. Yet another example of an event that may trigger interaction between the buffer cache manager and the NV cache 250 may be that a page is being replaced in the buffer cache manager in order to use available memory for a different page about to be cached.

Figure 2C:
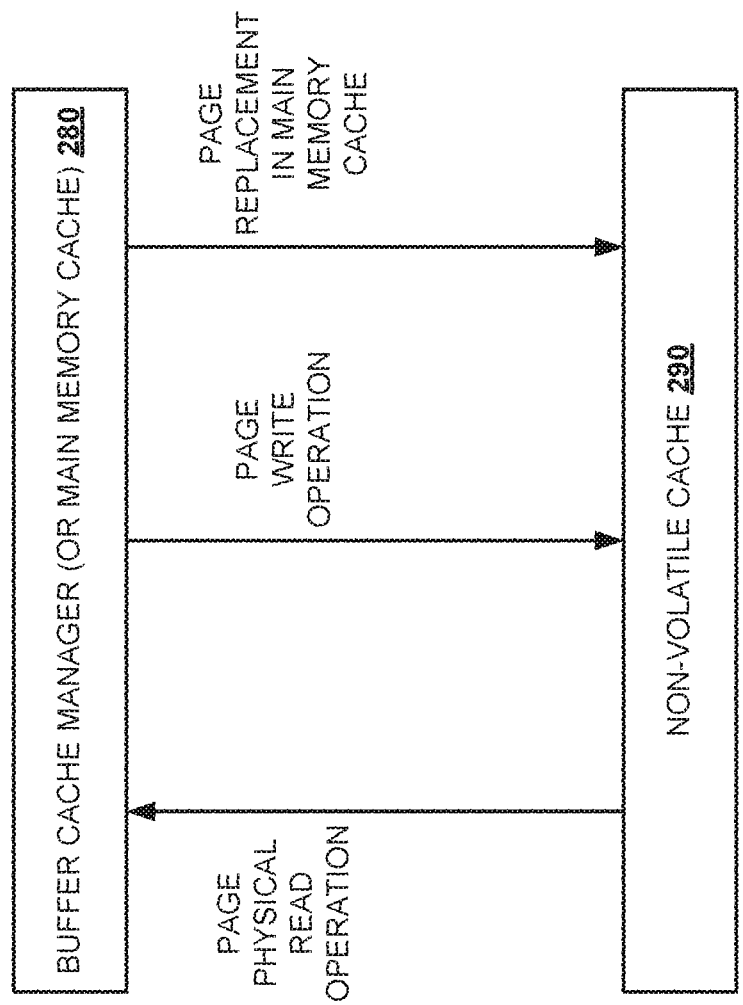
FIG. 2C is a block diagram illustrating an exemplary flow of data associated with transferring content related to cached pages in a database system, according to an example embodiment.

FIG. 2C is a block diagram illustrating an exemplary flow of data associated with transferring content related to cached pages in a database system, according to an example embodiment. The described flow defines interactions between a buffer cache manager 280 and a NV cache 290. The buffer cache manager 280 may be such as the buffer cache manager defined on FIG. 2B, and also to correspond to the main memory caches 205, FIG. 2A. The NV cache 290 may be such as the NV cache 250 layer on FIG. 2B, and also to correspond to metadata for an NV cache memory storage and cached content on the intermediate cache memory storage 245, from FIG. 2A.

In one embodiment, when a page is requested to be read, content associated with the requested page from the NV cache 290 may be transferred to the buffer cache manager 280. When a change to a requested page is performed, then a write operation for that page may be requested from the buffer cache manager 280 to the NV cache 290. The data associated with the requested operation with the page comprise metadata and page content, and the metadata and the page content are stored in separate sections of the NV cache memory.

When an access request is placed for a page not present in the buffer cache manager, then a page replacement operation is performed in the buffer cache manager. The page replacement operation may be associated with transferring the page from the buffer cache manager 280 to the NV cache 290.

Figure 3:
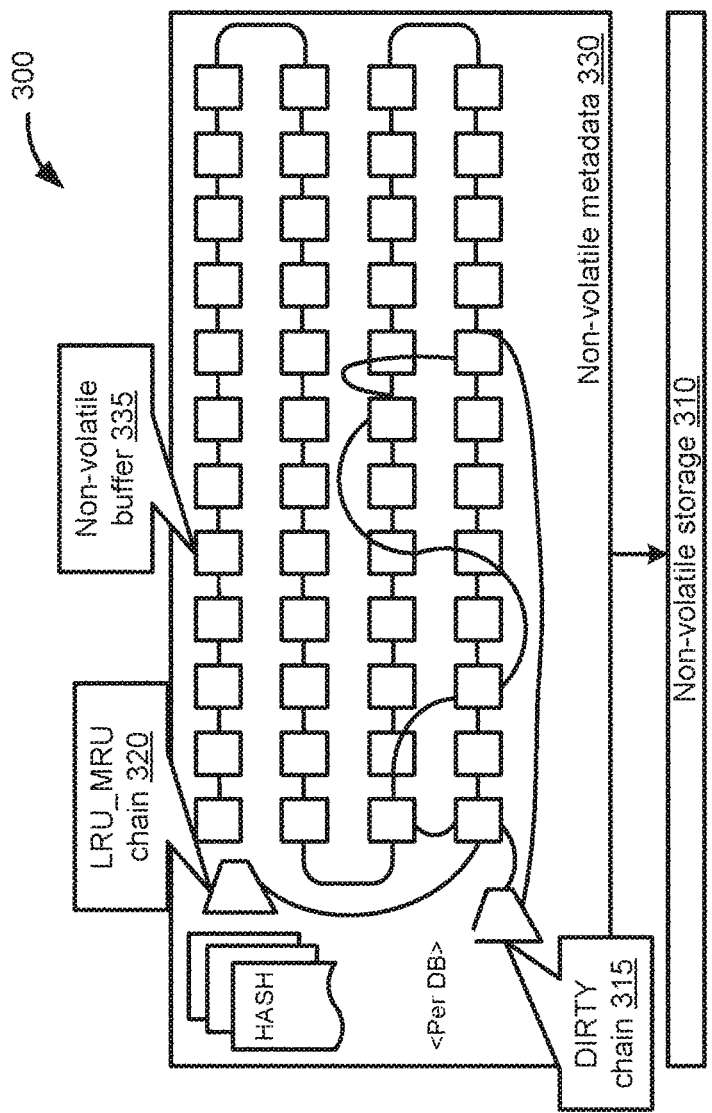
FIG. 3 is a block diagram illustrating an NV cache memory storage including cache metadata and a non-volatile disk storage for persisting cached data, according to an example embodiment.

FIG. 3 is a block diagram illustrating an NV cache memory storage 300 including a metadata cache and a non-volatile disk storage for persisting cached data, according to an example embodiment. The NV cache memory storage 300 may be configured in a database system part of a DBMS. For example, the NV cache memory storage 300 may be configured on a database system such as the database system 200, FIG. 2. The NV cache memory storage 300 may be defined with a particular size that corresponds to the size of a database, managed on the database system. The NV cache memory storage may be such as an NV cache memory storage part of the intermediate cache memory storages 245. The NV cache memory storage 300 includes NV metadata 330 and NV storage 310. The NV cache memory storage 300 persists cached data for only one database. However, the NV cache memory storage 300 may further persist cached data for more then one database.

In an example embodiment, within the NV cache metadata (or the NV cache metadata) information about cached pages and operations performed in relation to cached pages may be stored in non-volatile buffers that are selected from a buffer pool. For example, a non-volatile buffer 335 may be part of the NV metadata 330. The buffers that are allocated to the NV metadata 330 are buffers associated to a particular database, as the NV cache memory storage 300 is associated only with one database from the database system. The buffers are included as part of different data structures that are defined for storing the NV metadata 330. The NV buffer 335 may be related to one or more buffer chains that are defined for the NV metadata 330. For example, a page replacement chain, such as the LRU_MRU chain 320 may be defined. The LRU_MRU chain 320 defines a circular list of buffers. The buffers may be ordered starting with those buffers that are associated least recently used pages and ending with the most recently used pages.

A dirty chain 315 may also be defined. The dirty chain 315 is defined to include those buffers that are associated with pages that are changed on an NV storage, during user tasks performed with data from the pages in the database. Further details for the data structures that may be defined when storing metadata for an NV cache memory storage, such as the NV cache memory storage 300, are provided below.

Data Structures for Non-Volatile (NV) Metadata Cache

The NV cache memory storage maintains metadata for the cached pages associated with a database. An NV cache memory storage has a cache descriptor, which is a root for all data structures belonging to an NV cache metadata section for the NV cache memory storage. These descriptors are accessed when a request from an operation for accessing data on the NV cache memory storage is received. The NV cache memory storage stores cached pages associated with databases from a database system. Each page being stored in the NV cache memory storage has buffers as an in-memory structure defining the NV cache metadata. There is a strict one-to-one relation between pages and buffers in the NV cache metadata. Such buffers also exist in a main memory cache and are required to manage page contents on disk storage for the database. These buffers may be linked together in different data structures.

In one embodiment, buffers are part of the metadata stored in an NV cache memory storage associated with a given database. Different type of information associated with a cached page may be stored within a buffer. For example, the information stored in a buffer may be information about a page identity, including an identification of the database together with a page number. Further, the information stored for the buffer may include addresses to maintain various linked lists associated with the NV cache memory storage and the stored metadata.

The NV metadata may include a number of chains linking buffers. For example, a buffer may be linked in a hash chain associated with the NV cache memory storage, or in a LRU chain, or in another type of a chain that links buffers according to some configured criteria for caching on the intermediate NV cache storage. The information stored in a buffer may further include details about a location of the cached page on a device used for storing the cached pages for the NV cache memory storage. Additionally, there may be information about status bits that may be used to synchronize access for the cached page within a buffer.

In one embodiment, an NV cache memory storage is defined as an intermediate cache memory between a main memory cache and a database storage drive for a database part of a DBMS. The NV cache memory storage may include metadata comprising different chains linking buffers containing information about cached pages associated with the database. For example, the NV cache metadata may include a hash chain, a page replacement chain, a kept chain, a dirty chain, etc.

Hash Chain

A hash chain may be defined for an NV cache storage as part of the NV cache metadata. The hash chain may link pages that are cached on the NV cache storage. The hash chain may be used to determine if a page exists in the NV cache storage. The hash chain may be searched based on a provided page identity (ID). The page ID may include an ID of the DB. If a request associated with data from a database stored in a given page, for example, page X is requested, then that page X may be checked if it is hashed in the NV cache storage. The check may be performed through searching the hash chain defined in the NV cache metadata for the NV cache storage. If page X is not cached, then the search in the hash chain fails. Otherwise, if page X is cached, then based on the search in the hash chain, an address to a buffer associated with page X may be provided.

A hash chain may be maintained through defining a hash function. The hash function may be a function that maps page identity to a position within a bucket that holds the content of a cached page. The bucket may be defined as a buffer area that represents an array of cells that either point to Null values or to an overflow chain. An overflow chain may be defined as a singly linked list of buffers for storing information about cached pages. Each buffer in the list in the overflow chain may have the same hash function value.

Page Replacement Chain

A page replacement mechanism is utilized for caching pages on an NV cache storage. A database includes more pages compared to capacity of the NV cache storage. Hence, when the NV cache storage gets full and a page needs to be added to the NV cache storage, a page from the NV cache storage has to be replaced. A page replacement chain may be maintained to link buffers in the NV metadata part of the NV cache storage. The page replacement chain may be used to quickly determine which page is to be replaced. The page replacement chain is a doubly linked circular list. One of the ends of the page replacement chain is considered an LRU end (Least recently used) and the other end is known as an MRU end. When a page from the NV cache is accessed, a buffer associated with the accessed page is linked to the MRU end of the page replacement chain. In such manner, the LRU end is maintained to be the end with least recently accessed pages, namely, the oldest ones are kept in the LRU end of the page replacement chain.

Ordering the buffers in the page replacement chain in an order from LRU to an MRU end may be predefined. Chances of pages being accessed again are higher for recently accessed pages that are stored near the MRU end compared to oldest pages, near the LRU end. Hence, when determining which page to replace, a page from the LRU end may be selected. When a page is added or replaced in the NV cache storage, it is present also in the main memory cache associated with the corresponding database in the DBMS. Then, the page may be removed from the page replacement chain and added to a kept chain.

When a page that is accessed from the NV cache is changed, e.g. through a write operation, then the page becomes so called "dirty" by user tasks. If a page is classified as "dirty", then the page is removed from the page replacement chain and is added in a dirty chain defined in the NV cache metadata. When a page that is classified as "dirty", it is moved from the NV cache storage to a DB storage of the database on a disk space. This operation performed for the "dirty" page makes it a "clean" page. A page, that is made clean after being classified as dirty, is moved back into the page replacement chain. Such page may be removed from the main memory cache associated with the database containing the page. The transition of states of pages that are kept in NV cache metadata is different from the main memory cache design for keeping track of cached pages and performed changes.

Kept Chain

A kept chain is a doubly linked list maintained in the NV cache. Though maintaining a kept chain, the performance of the NV cache storage is optimized. The kept chain is a chain of buffers comprising metadata for cached pages. The cached pages are also cached in the main memory cache. The goal of maintaining a kept chain in the NV cache metadata is that pages, which are present in the main memory cache, can be read, or written, or replaced at anytime. In such manner, the NV cache storage is not taking care to replace these pages. Hence, these pages are moved out of the page replacement chain and are added in the maintained kept chain. When a page is present in the main memory cache and it is added in the NV cache storage, then a buffer corresponding to the page is added to the defined kept chain in the NV cache metadata. When a page is removed from the main memory cache, the buffer corresponding to the page is moved out of the kept chain in the NV cache metadata. When the page is moved out of the kept chain, the buffer associated with the page is not moved out of the NV cache storage. The page that is moved out of the kept chain may be still present in the hash chain defined in the NV cache metadata.

In one embodiment, the NV cache hosts more buffers for cached pages in the NV cache metadata compared to the main memory cache. Otherwise all pages cached in the NV cache storage may be linked into the kept chain and the page replacement chain may remain empty. Thus, the NV cache storage may not be used for new pages. Hence, the size of the NV cache storage is configured to be higher than the size allocated for the main memory cache, both associated with the corresponding database. Within the main memory cache, buffers that are kept are defined for pages that are being used by multiple user tasks. Until multiple tasks are performed in relation to content associated with cached pages in buffers, the buffers are marked as kept in the main memory cache. However, in the NV cache storage, the kept chain includes buffers that correspond to buffers for pages resided on the main memory cache. In such manner, pages present in main memory cache and present in NV cache are present in NV cache kept chain.

Dirty Chain

A dirty chain is a doubly linked circular list. If a DBMS server is rebooted, a dirty chain corresponding to a database from the DBMS is recreated. Dirty chain is recreated during server reboot. When caching data associated with database from a DBMS, pages are cached together with information about changes, updated, additions, and so on. The pages may be chained in-memory first and then they may be written back to the database storages on the DBMS. The writing back of the changes from the in-memory to the disk storages for the databases may be performed in a delayed manner.

If an NV cache storage is associated with a database, then user transactions are first written on an intermediate cache memory storage, such as the intermediated cache memory storage 245. The transactions are first stored on the designated NV cache memory instead of a disk drive associated with the database. A list of all pages related to performed operations is maintained in-memory and utilized by a defined background task (for example, the Lazy Cleaner function described below) to regularly clean information about the transactions from the NV cache and thus to maintain a healthy cache storage with updated metadata.

Cache Operations by User Tasks—Page Write Operation

Whenever a page is written, page contents are written to a persistent storage, which is usually a hard disk drive storage on which the database including the page has been created. When an NV cache layer is introduced into a DBMS, a page is written to the NV cache before it is written on the hard disk drive storage associated with the database. To perform writing operations on the NV cache, a number of operations are performed.

A search into a hash chain defined in the NV cache metadata is performed. The hash chain links buffers associated with pages that are cached on the NV cache. The search in the hash chain is performed to determine if the page is present in the NV cache and whether it is associated with a particular buffer, for example B1. Then, a check is performed into the dirty chain to determine if the page is classified as "dirty". A page is classified as "dirty" when there were changes for the page written to the NV storage due to user interactions, but not yet transferred and written to a DB storage. If B1 is determined to not be associated with a dirty page, then B1 is added in a dirty chain. Then B1's status bit is set in the maintained NV metadata. Afterwards, page content is written to an NV cache disk storage by getting the location of the page content from the buffer B1.

When the page that is requested for a write operation is not found in the NV cache, then an LRU chain is searched to determine a new buffer, e.g., buffer B2. The buffer B2 is removed from the hash chain, as B2's page identity is being changed. The buffer B2 is added into a kept chain and the buffer associated with the page is not replaced. Buffer B2 is removed from the LRU chain afterwards. Then, the page is written to a disk storage by getting the location from buffer B2.

Cache Operations by User Tasks—Main-Memory Page Replacement

A page is being removed from the main memory cache, when for example the page was not changed during page's lifetime in the main memory cache. For example, if there were no select queries processed that were associated with that page, then main memory page replacement algorithm may choose the page to be replaced. In such cases, if the DBMS does not include an NV cache intermediate layer, a buffer associated with such a page would be reused for a different page. Also, no change is to be performed for the content of the page on the database storage on a hard disk drive since the page contents were never changed by user tasks. When an NV cache intermediate layer is configured on a DBMS, then if a page is removed from the main memory cache, the page is added to the NV cache layer in a similar way to performing a page write operation. If the page is already present in the NV cache, then the page content is not written on the NV cache. The page may be classified as "clean" as there are no changes in the page content.

To add a page including page content in the NV cache the following steps may be performed. A hash chain defined in the NV cache is searched to determine whether the page is present in the NV cache. If the page is present in the NV cache, then a buffer B1 is determined to be associated with the page. Then, a dirty chain is checked to determine if the page is classified as "dirty". When B1 is not associated with a dirty page then nothing else is performed and the process of page replacement finishes. When B1 is associated with a page that is classified as "dirty", then buffer B1 may be included into the dirty chain and page content may be written on NV cache disk storage using the determined B1 buffer. If the page is not present in the NV cache, then a page replacement chain (e.g., a LRU chain) is searched to determine a second buffer B2. B2 buffer is associated with the page and B2 buffer is removed from the hash chain. B2's page identity details are changed. After providing new page identity for buffer B2 associated with the page, then the buffer B2 is added again into the hash chain. Then, B2 is added into the kept chain in order not to be replaced, and then B2 buffer is removed from the LRU chain. In such manner, the page is written on the NV cache storage disk drive through the defined physical location of buffer B2. At the end, the buffer B2 is removed from the kept chain, as the page is not present in the main memory cache. The pages that are linked into the kept chain in the NV cache are pages that are not present on the main memory cache.

Cache Operations by User Tasks—Page Read Operation

A page may be cached in the main memory cache. Then, if a read operation is requested for that page, then the page contents is returned from the main memory cache. If the page is not present in the main memory cache, then the main memory cache communicates with the NV cache to search into the hash chain defined in the NV cache to determine whether the page is present in the NV cache. If the page is present in the NV cache, then a buffer B1 is determined to be associated with the page. Then, the B1 buffer is added into the kept chain defined, so that buffer is not to be replaced. Page contents are read from NV cache disk storage using a location defined and stored in B1. In case a page is not present in either the main memory cache or the NV cache, then the NV cache content is not changed, and reading is performed from the database storage on a hard disk drive.

Figure 4:
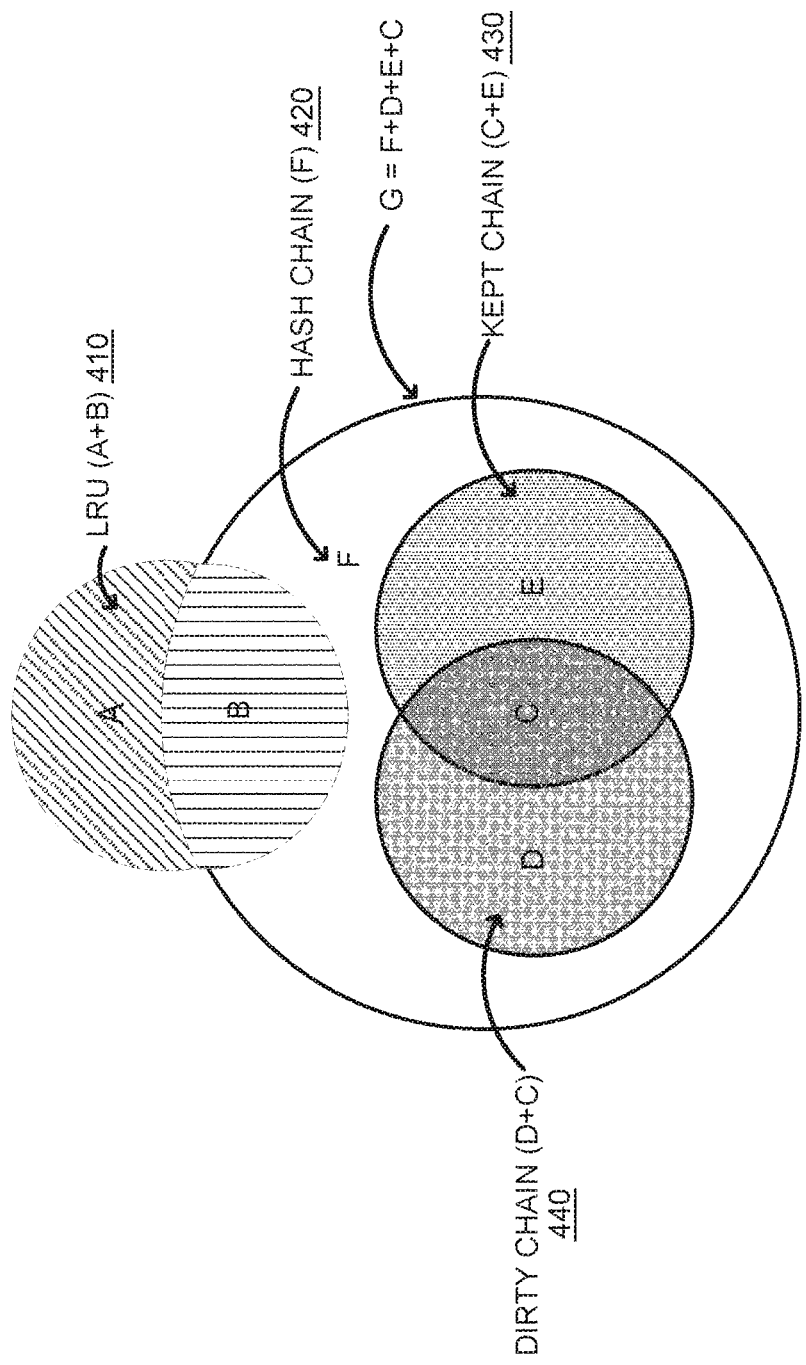
FIG. 4 is an exemplary block diagram illustrating a number of sets including buffers stored in an NV metadata included in an NV cache layer, according to an example embodiment.

FIG. 4 is an exemplary block diagram illustrating a number of sets including buffers stored in an NV metadata included in an NV cache layer, according to an example embodiment. The block diagram includes sets of buffers, which are included in different buffer chains. Two sets of buffers corresponding to two different buffer chains may intersect and they may have one or more common buffers. The sets of buffers are included correspondingly in a number of chains defined in the NV metadata, such as an LRU chain 410, a hash chain 420, a kept chain 430, a dirty chain 440. The different chains include different set of buffers representing certain aspect of buffer state.

FIG. 4 provides a representation of an intersection of the sets of buffers defined in the different chains. The sets of buffers associated with the chains are presented as circles. For example, the LRU chain 410 is presented as a circle including section A and section B. The buffers that are part of the set of buffers part of section A are buffers that have no identity. The buffers that are part of the section A are not hashed, which implies that a NV storage content associated with these buffers do not contain any valid database pages. Such buffers may be replaced.

Usually, after an NV cache is created, all of the buffers defined for the NV cache are included in the LRU chain 410 and are part of section A. In such case, there are no buffers that are part of section B. However, when a buffer is associated with a cached page, the buffer is made part of the hash chain (F) 420, and becomes part of section B, rather than section A. Buffers that are part of section B are replaceable clean buffers as they are not part of a defined dirty chain and a kept chain, such as dirty chain 440 and kept chain 430.

Buffers in section B are hashed buffers that have an identity on the NV storage disk, and the disk content of the NV storage disk is filled in with content of a cached database page. Buffers from section B are not buffers that are part of the kept chain 430 and thus, such buffers may be replaced and used for storing content for other cached pages. The buffers on the NV storage associated with the buffers from the metadata that are part of section B are clean buffers on the NV storage. The buffers from section B are associated with the same content of the page as that persisted on the main hard disk storage for the database. Section C on FIG. 4 includes a set of buffers from the NV metadata that are part of the dirty chain 440 and the kept chain 430. Such buffers are associated with pages that are cached in the main memory cache and are not replaceable buffers.

Buffers that are part of section D are not part of the kept chain 430, and not hashed in main memory cache. Buffers in section D are associated with dirty pages, so NV cache disk storage has new copies compared to the copy stored in the main database storage on a hard disk drive. Buffers in section D are not replaceable because NV disk storage has the latest copies that should be transferred to the main database storage on the hard disk drive before buffer can be replaced in order to be used for a different page. After a copy to the main database storage is performed, buffer from section D are about to become replaceable and be moved to section B.

Buffers that are part of section E are associated with clean pages and the buffers are linked into the kept chain 430. The pages associated with the buffers are cached in the main memory cache. Buffers that are part of section E are not replaceable, as pages associated with that buffers may be later read from the NV cache, and/or write operations may be performed. Buffers, part of section F, are hashed buffers, which are not part of any other chain apart from the hash chain. A hashed buffer, after being included into the hash chain, is required to be included in at least one of the dirty chain, the kept chain, and the LRU chain. Hence, no buffer would exist in F. If each chain is considered as a mathematical set containing buffers then: G=D+E+C+B+F, and the hash chain (F) 420 is an empty set. The buffers from the whole NV cache then is a set H=G+A.

In one embodiment, buffers from the kept chain are hashed buffer as they are present in the main memory cache and are also present in the NV cache. Such buffers are not in the LRU chain, as the LRU chain includes buffers that are replaceable, and pages that are present in the main memory cache are not to be associated with buffers that are replaceable in the NV cache. In such manner, multiple write operations over a page that is cached in the NV cache are supported, and are not overwritten or replaced. The NV cache size may be defined to be of a larger volume in comparison to the main memory cache in order to accommodate space for buffers in a kept chain.

The buffers from the dirty chain are also hashed buffers and they are related to data that is not yet written on the NV cache storage. Buffers from the dirty chain are also not part of the LRU chain, as buffers in the LRU chain are replaceable. Buffers associated with dirty pages have content that is not yet transferred to the database storage on hard disk drive space. Such buffers are supposed to be kept into the dirty chain until they are written back into the hard disk drive space associated with the database storage.

Exemplary State Charts for Buffers Linked in Chains Defined in NV Metadata for an NV Cache Memory Storage A buffer from the NV metadata may be linked into the defined chains for the NV metadata in the NV cache memory storage. A buffer may participate in 4 chains—an LRU chain, a kept chain, a dirty chain, a hash chain. A buffer may be part of at least one of these 4 chains. Table 1 defines an example for a buffer, which changes state and presence in the different chains defined. Each row displays an allowable state for including a buffer in a set of chains from all of the four chains. Y denotes that a buffer is part of a chain and "-" means it is not part of the corresponding chain.

TABLE 1

| LRU chain | Kept chain | Dirty chain | Hash chain | Description |
|---|---|---|---|---|
| Y | — | — | — | Uninitialized buffer during an NV cache creation or DBMS server startup |
| Y | — | — | Y | Hashed, clean and replaceable page associated with the buffer |
| — | Y | — | Y | The buffer is associated with a not replaceable page, as the buffer is in kept chain (the page is present in MMC) |
| — | — | Y | Y | Dirty page. Not present in main memory cache (hence unkept in NV cache) |
| — | Y | Y | Y | This is an example of a buffer associated with a dirty page. Present in main memory cache also (hence kept in NV cache) |

Table 2 defines examples of states of buffers which are not allowed. The accompanying description provides the reason to not allow each buffer state.

TABLE 2

| LRU chain | Kept chain | Dirty chain | Hash chain | Description |
|---|---|---|---|---|
| — | — | — | — | Buffer has to be present in at least one chain from all of the defined chains |
| — | Y | — | — | Kept buffers should have an identity, so a buffer has to be hashed, i.e. linked into the kept chain |
| — | — | Y | — | Dirty buffer should have an identity, so it has to be hashed |
| — | — | — | Y | Hashed buffer has to exist in at least one of the LRU, kept or dirty chains |
| Y | Y | — | — | The LRU and the kept chain are mutually exclusive. A buffer may not be both part of the LRU chain and the kept chain simultaneously. |
| Y | — | Y | — | The LRU and the dirty chain are mutually exclusive. A buffer may not be both part of the LRU chain and the dirty chain simultaneously. |
| — | Y | Y | — | Kept/Dirty buffer should have an identity, so it has to be hashed |
| Y | Y | Y | — | Kept/Dirty buffer should have an identity, so it has to be hashed |
| Y | Y | — | Y | LRU and dirty chain are mutually exclusive. A buffer may not be both part of the LRU chain and the kept chain simultaneously. |
| Y | — | Y | Y | LRU and kept chain are mutually exclusive. A buffer may not be both part of the LRU chain and the dirty chain simultaneously. |
| Y | Y | Y | Y | LRU, dirty & kept chain are mutually exclusive. Buffer may not be part of all chains simultaneously |

Meta Page Chains in Metadata for NV Cache Storages

Meta chain including meta pages are introduced into the metadata for NV cache storages. Such meta chains with meta pages are not present in main memory cache and database. The purpose of meta pages is to manage allocation of pages on NV cache disk.

In one embodiment, in a NV cache storage all cached pages associated with a database are kept on a non-volatile disk storage. Metadata including meta pages are maintained in memory and also are kept on the non-volatile disk storage. Meta pages are defined with a meta-page layout. A meta page is a list of fixed sized element entries. An entry in the list stores information for a database page that is managed in the metadata of the NV cache, and specifically defined on the meta page. A meta page may be defined with a fixed size, which may not be related to the page size used for the database.

An element entered into the list of elements defined in a meta page stores information about a page ID, and a status bit mask that defines an initialization status and a dirty status of the cached pages, which is associated with the element in the list of the meta page. Meta pages are stored on NV cache disk storages and in memory in one and the same format. Having a common format for storing data in meta pages makes it easier to write in-memory content to or read in-memory content from the NV cache disk storage.

When a new page is added into an NV cache associated with a database, an entry into the list of a given meta page is provided. Similarly, if a page is replaced in the NV cache, then a new entry is made in the meta pages. When changes are already performed for a page and cached in the NV cache (e.g., the page is made "dirty"), then the data stored in the meta pages for that page are not changed. Meta pages are newly introduced data element by the NV cache as an intermediate layer of caching. A non-volatile storage device is used to store meta pages, as the speed on a non-volatile storage device is faster than the speed, provided by hard drive disks used for storing all the data of a database in a DBMS. Meta pages have fixed positions on NV cache storage disk to ensure that NV cache size can be dynamically increased.

Data Page Layout for Storing on NV Cache Storage

A page of a database that is cached and stored on an NV cache storage is received from a main memory cache and is later transferred to a hard disk drive for storing all of the content of the database. A data page layout defined for the NV cache storage is corresponding to the data page layout associated with cached data pages in a main memory cache. A data page that is cached on the NV cache storage is associated with storing data into meta-data pages to manage allocation of the data page and to define "dirty" status of the data page without making changes in the data page layout.

Figure 5:
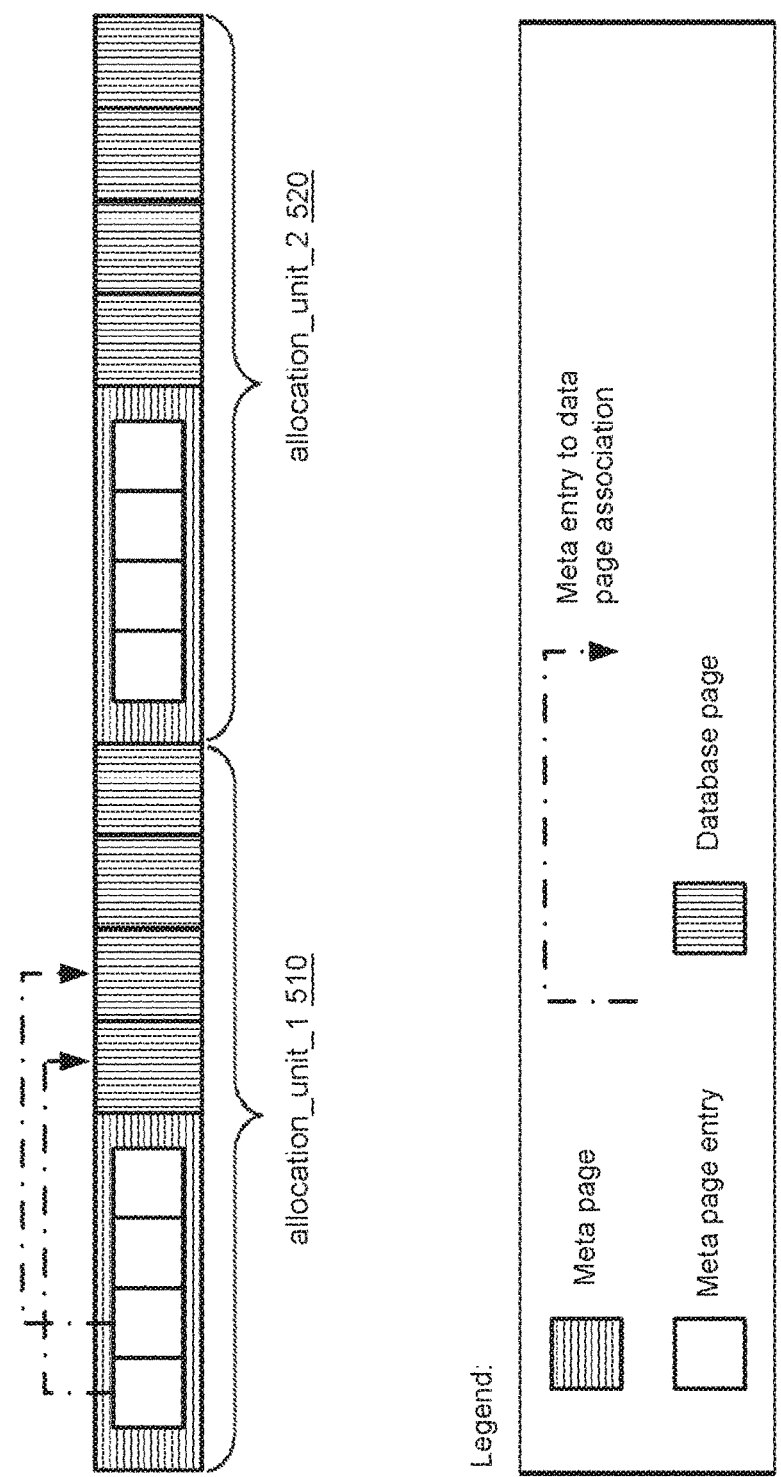
FIG. 5 is a block diagram illustrating an NV cache layout, according to an example embodiment.

Layout for the NV disk space associated with an NV cache for a database in a DBMS FIG. 5 is a block diagram illustrating an NV cache layout, according to an example embodiment. The NV cache layout is defined according to a different new design compared to hard disk storage page layout design. A meta page and data pages associated by the meta page together define an allocation unit in the NV cache. Allocation_unit_1 510 and allocation_unit_2 520 are examples of allocation units comprising one meta page and 4 database pages. A meta page and correspondingly associated data pages are collocated contiguously. An entry in a meta page corresponds to a data page in the corresponding allocation unit. The entries in a meta page store meta information about pages stored at corresponding positions starting from the meta page. All allocation units, such as allocation_unit_1 510 and allocation_unit_2 520, are also contiguous on disk.

Figure 6:
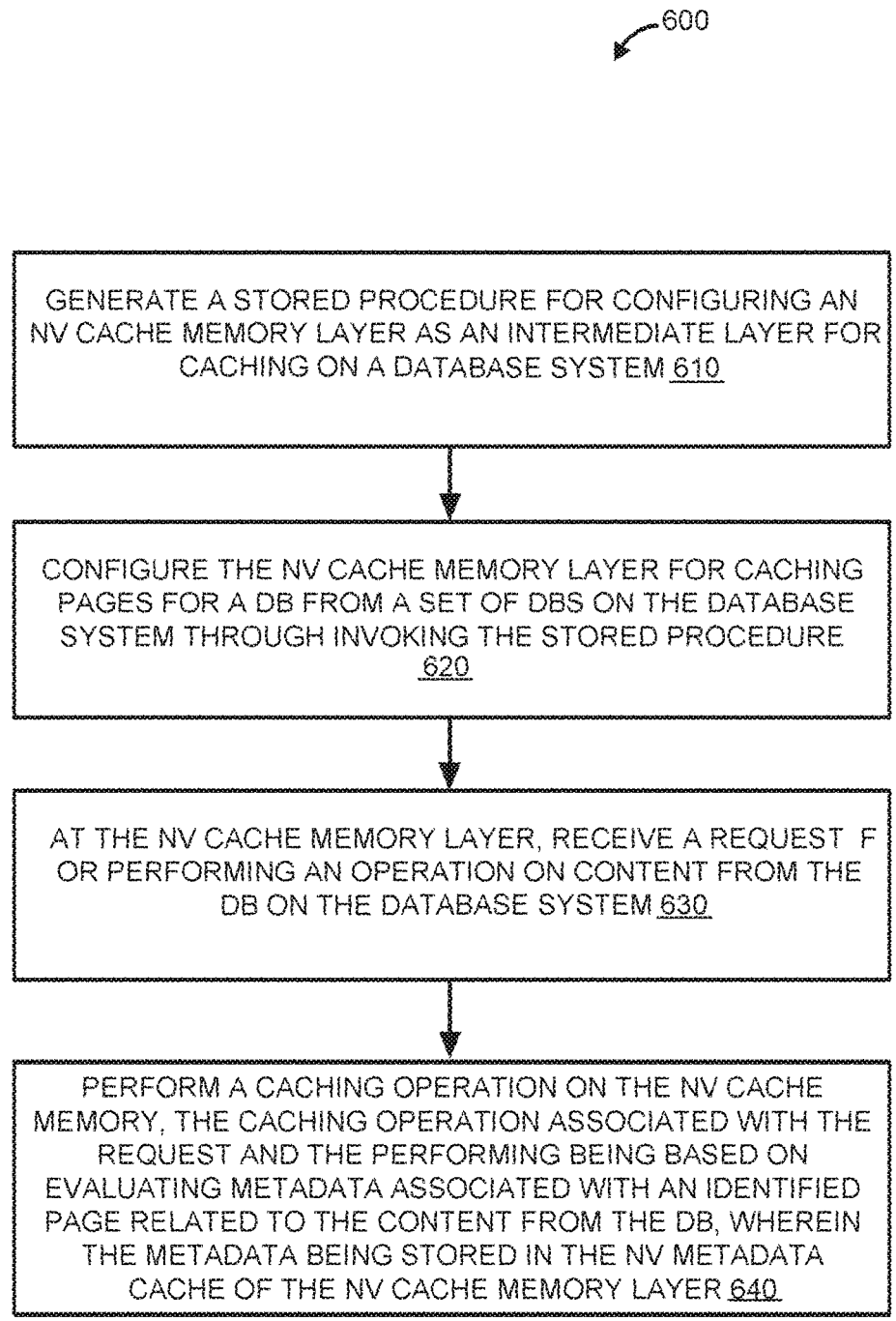
FIG. 6 is a flow diagram illustrating an NV cache memory storage configuration process in a database system, according to an example embodiment.

FIG. 6 is a flow diagram illustrating an NV cache memory storage configuration process 600 in a database system, according to an example embodiment. FIG. 6 defines steps 610, 620, 630 and 640 that may be performed in relation to configuring the NV cache on a database system and performing caching operations on the database system. The illustrated process 600 may be executed, for example, on a database system as the systems presented on FIG. 1A, FIG. 1B, FIG. 2A. The process 600 is not limited to the example embodiments associated with the figures—FIG. 1A, FIG. 1B, FIG. 2A. The NV cache memory storage provides a fast access disk file storage for the cached data that may reduce the time for performing different operations related to data from databases.

Figure 7:
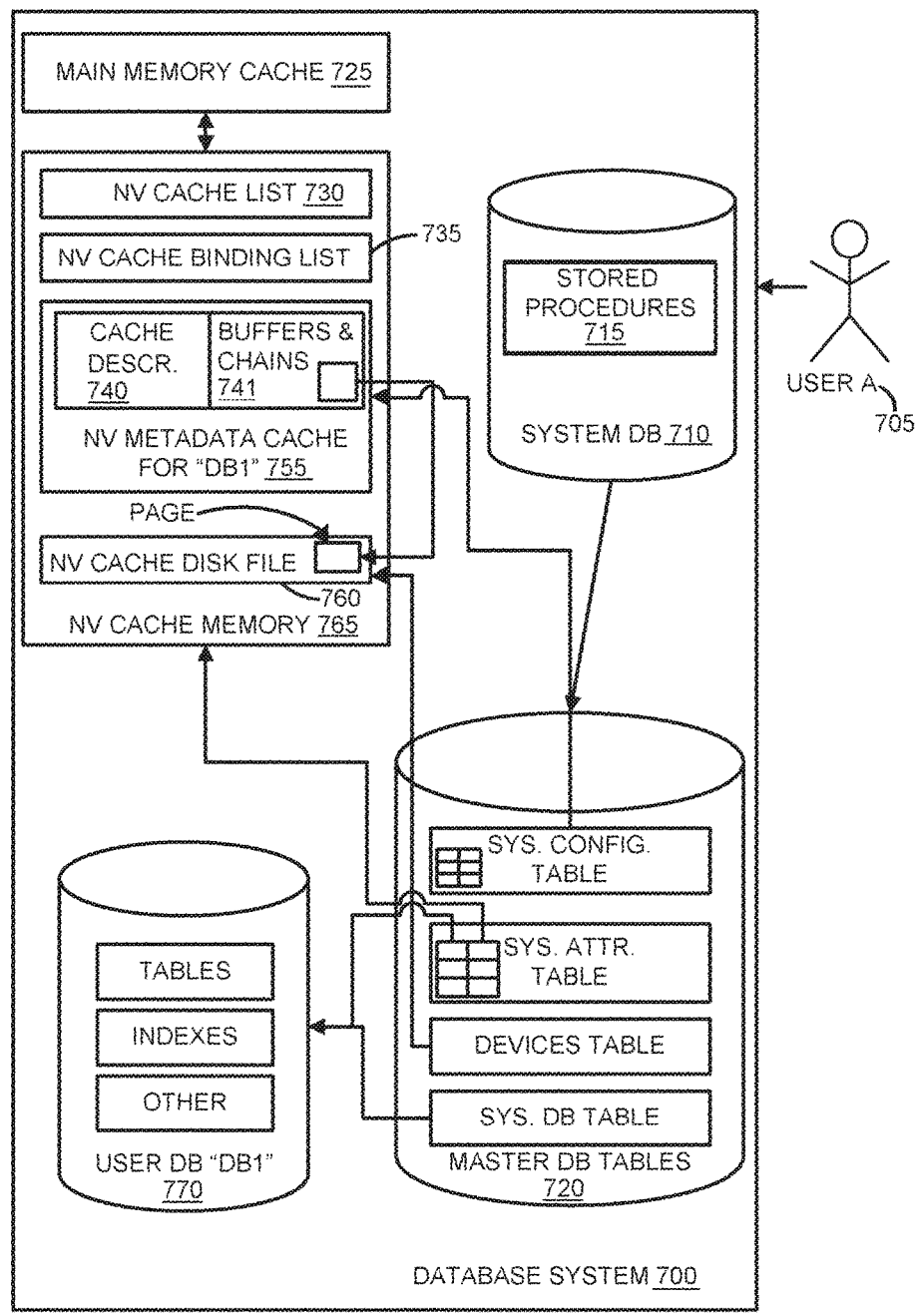
FIG. 7 is a block diagram illustrating a system introducing an NV cache memory storage in a database system, according to an example embodiment.

FIG. 7 is a block diagram illustrating a system introducing an NV cache memory storage in a database system 700, according to an example embodiment. The database system 700 includes a set of user databases, such as the displayed user database on FIG. 7. The user database "DB1" 770 includes tables, indexes, and other content. The database system 700 further includes a main memory cache 725, a system database 710, and a master DB 720. The master DB 720 includes master DB tables. The database system 700 introduces also an NV cache memory 765, which is configured on the database system 700 through the master database tables 720. The NV cache memory 765 may correspond to the intermediate cache memory storage 245 in FIG. 2A, the NV cache 250 in FIG. 2B, the NV cache 290 in FIG. 2C.

In one embodiment, the NV cache memory 765 communicates with the main memory cache 725 and with the user database "DB1" 770. The NV cache memory 725 includes an NV cache list 739, an NV metadata cache 755 for user database "DB1", and an NV cache disk file 760. The NV cache disk file 760 may be created on a file system that is mounted on an NV device through a host operating system. The NV cache memory 765 manages page layout on the NV disk file 760. The page layout on the NV cache memory 765 corresponds to the provided description above. The NV cache memory 765 includes the NV cache list 730, which defines a number of NV caches that are associated correspondingly with user databases on the database system 700. For example, for the user database "DB1" on FIG. 7, one NV cache is configured, which is listed in the NV cache list 730. There is NV metadata cache for "DB1" 755, which is generated for that NV cache associated with the user database "DB1" 770.

The master database tables 720 store cache configurations and their associations (also called "bindings") with databases. These tables are used to reconstruct defined NV cache(s) in the NV cache memory 765 during server reboot. The master database tables 720 include a system configuration table, a system attributes table, a devices table, and a system database table. The system configuration tables include a set of rows. A row from the system configuration table includes values for defined table columns. With the defined columns, data stored in rows include information about NV cache configurations, such as definition of an NV cache size, an NV cache name, etc. The devices tables include rows, where a row in the devices table includes columns storing file location for the NV cache disk, and/or file size, etc. The system attributes table includes rows, where a row in this table defines bindings between a defined NV cache and an associated database. The system database table includes rows, where a row in the table contains information for different databases.

The database system 700 includes a system DB 710, where stored procedures 715 are persisted. The stored procedures include a set of instructions that may be invoked by end users of the DBMS, for example user A 705. In order for a database administrator to create and manage NV caches on the database system 700, a set of stored procedures may be created, persisted, and provided as part of the installation process of the database system 700. A vendor of the database system 700 may provide an installation for the database system 700. The installation may be generated to include stored procedures through which execution an NV memory intermediate layer may be introduced as a middle layer for caching on the database system 700.

The stored procedures 715 are created inside the system database 710, where system procedures are stored. For example, the stored procedures may include a procedure "sp_nvcacheconfig" to configure a particular instance of NV cache memory 765 related to a particular database on the database system 700, such as the user database "DB1" 770. Through executing the stored procedure associated with configuring the NV cache, information associated with the NV cache may be configured, or updated, or presented, or the configured NV cache may be dropped. The stored procedures 715 on the system database 710 may include further a stored procedure "sp_nvbindcache" for binding a created and configured NV cache to a particular database. Further, the stored procedures may include a stored procedure "sp_nvhelpcache" to provide information about an NV cache and defined binding for the NV cache. Through configuration files, the DBMS 700 provides a simple file-based approach for database administrators to change configurations of NV caches on the DBMS.

Configuring an NV Cache on a Database System NV Cache Memory Creation

In this section, cache configuration operations, associated with the presented elements in FIG. 7 are described. When an NV cache is created in relation to a database, such as the user database "DB1" 770 on the database system 700, a user A 705 may need to establish a connection to a server with administrative rights. The user 705 may invoke a command, e.g. <disk init . . . > command, to create an NV cache disk file on the database system 700. Then, a new row is added to the devices table that corresponds to the newly created NV cache. A stored procedure to configure the NV cache may be invoked. A main memory cache identification and information about the created NV cache disk file are provided by the user, when invoking the stored procedure for configuring the NV cache. Then, a new row is added to the system configuration table. The new added row in the system configuration table links the row in the devices tables through a foreign-key linking for a device ID (for the created NV cache disk file).

A server from the database system 700 internally allocates memory required for the NV metadata, including the cache descriptors 740 and the buffers and chains 741. The allocated memory is required for the operation of the NV cache memory layer. The buffers defined in the NV cache metadata 755 may point to pages on the NV cache disk file 760. To point to the pages on the NV cache disk file 760, the buffers may store file offsets. Buffer chains may be initialized in the NV cache metadata 755. The buffer chains may be of different type, and may link a different number of buffers from all of the buffers defined in the NV cache metadata 755. Meta pages on the NV cache disk are cleaned. Then, the NV cache memory is created successfully. However, the NV cache memory 765 may not be used for caching pages up until the NV cache memory 765 is bound to a particular database, such as the user database "B1" 770 on the database system 700. The NV cache list 730 from the NV cache memory is an in-memory list of cache descriptors. When the NV cache memory 765 is created, then a new node is included in the NV cache list.

NV Cache Binding to User Database

In order to bind a created NV cache part of the NV cache memory 765 to a user database, such as the user database "DB1" 770 on the database system 700, the user A 705 establishes a connection to a server on the DBMS 700. On that server, the user A 705 has administrative rights. The user A invokes a stored procedure for binding NV cache, such as an "sp_nvbindcache" stored procedure. In order to perform the binding, the user A 705 provides a name of the NV cache that is about to be bound and a name of the database. The database 770 is bound to the NV cache. A new row is created inside the system attributes tables on master database 720.

The master database 720 is a starting point to store information for multiple databases managed by a database system 700. The master database 720 may include tables, such as the master database 720 tables presented in relation to FIG. 7. It also stores configurations, which determine server's behavior. The new row contains details about identity of the bound database and NV cache name. The identity of the database may be taken from the system database table on the master DB tables 720. The name of the NV cache that is about to be bound to the database 770 is taken from the system configuration tables from the master database tables. The name that is taken from the system configuration tables matches the name provided by the user when initiating the binding process. Then an NV cache binding list 735, part of the NV cache memory 765 is updated with the defined binding pair. The NV cache binding list 735 is an in-memory list for storing binding pairs of NV caches and user databases on the database system 700. The new binding pair is included as a new node into the cache binding list. During runtime of the database system 700, it is determined whether a database is bound to an NV cache through the NV cache binding list 735.

Updating NV Cache Size

In order to update size of an already created NV cache on the database system 700, the user A 705 establishes a connection to a server on the database system 700. On that server, the user A 705 has administrative rights. The user A 705 invokes a disk resize command to increase the defined cache size for the requested NV cache, configured on the database system 700. The requested NV cache is included in the NV cache memory 765, and may be such as the NV cache created in relation the user database "DB1" 770. When the user A 705 requests a decrease the size of the NV cache, then a drop operation for that NV cache may be performed and then a new NV cache may be recreated to correspond to the definition of the previous NV cache, but with the newly requested smaller size. When an update of the NV cache size is requested and performed, a row in the devices table in the master DB tables 720, corresponding to an NV disk file for the requested NV cache, is updated. Then, the user A may call a stored procedure for configuring NV caches, e.g. "sp_nvcacheconfig" procedure. With the invoking of such a stored procedure, a row in the system configuration table in the master database tables is updated. The updated row corresponds to the requested NV cache. Also, additionally required memory for buffers in the NV cache metadata for the requested NV cache is allocated. The additional buffers are linked into appropriated defined chains in the NV cache metadata. Newly added metadata page on the NV cache disk file for the requested NV cache are cleared out.

NV Cache Unbinding

In order to unbind a created NV cache to a user database, such as the user database "B1" 770 on the database system 700, the user A 705 establishes a connection to a server on the database system 700. On that server, the user A 705 has administrative rights. The user A invokes a stored procedure for binding NV cache memory, such as the described "sp_n- vunbindcache" stored procedure. In order to perform the "un-binding", the user provides a name of the database from which NV cache binding is to be removed. Then a row in the system attributes table, associated with that requested NV cache, is deleted. Then some in-memory changes are performed, including changes in the NV cache binding list and the buffer chains. A node from the NV cache binding list, which is associated with the NV cache is removed, and the buffer chains defined in the NV cache metadata are updated. Cached pages on the NV cache, which are not yet transferred and written on the disk space for the bound user database are read from the NV disk file of the NV cache and are written on the disk space for the bounded user database. The requested NV cache is unbound to the database, and the NV cache is not used for caching until the NV cache is bound to another database again.

NV Cache Drop

In order to drop a created NV cache on the database system 700, the user A 705 establishes a connection to a server on the database system 700. On that server, the user A 705 has administrative rights. The user A 705 invokes a stored procedure for configuring NV cache memory 765 and provides an NV cache name corresponding to the NV cache that is requested to be dropped. In the stored procedure, a NV cache disk file may be specified to be equal to "NULL", corresponding to a request to clear out the disk for the requested NV cache to be dropped. In order to drop an NV cache, first the NV cache is unbound from any database. Then a row corresponding to the dropped NV cache is deleted from the system configuration table. Used memory for that NV cache is released. Then, user A may invoke a stored procedure to drop an NV disk file associated with that NV cache. The user A has to delete the disk file from the file system using commands provided by an operating system.

NV Cache Recovery Process

An NV cache recovery process may be defined on the database system 700 for a configured NV cache memory bound to a database. The NV cache recovery process may be triggered from a crash or reboot of the database system 700. The cache recovery process may be similar to a cache creation process. The NV cache recovery process is a multi step operation. Database recovery is done after NV cache recovery as NV cache may contain pages not yet written to DB storage. The pages may be accessed during server startup as part of database recovery. Hence NV cache recovery should precede database recovery. A database recovery may use main memory cache, which will consequently use the NV cache. Hence hash chain, dirty chain, kept chain might get pages used during the whole recovery process.

In a recovery process of the NV cache, the metadata from the NV cache may be re-instated from the NV storage. Pages stored on the NV storage may be used to help recovery. The NV cache recovery process may be different with respect to the fact that all meta pages may be read from the NV cache storage. The meta pages provide page identities, stored in data pages, together with page status, for example, whether a page is "dirty", or "clean", etc. After the NV cache recovery process, the state of chains, defined in the NV cache metadata, is updated. Immediately after NV cache recovery the state of chains is as follows. The hash chain contains all pages, which were hashed before crash or reboot of the database system 700. The kept chain is specified as empty, as the main memory cache is also empty after the crash or reboot of the system. The dirty chain contains all pages, which were dirty before crash/reboot. The page replacement chain (e.g. LRU chain) includes pages, which were not classified as dirty. The meta page chain is recreated based on a defined NV cache size for the NV cache. The meta pages are restored from the NV cache storage.

Determining a Space Usage of the Configured NV Cache

In one embodiment, a relaxed adaptive allotment (relaxed quota system) may be used to determine the space usage of the NV cache in case there is many to one, one to many, or many to many mappings between the defined main memory caches and the NV caches configured on a database system. In such manner, NV cache page replacement algorithm is optimized based on mapping between NV cache and main memory caches, as defined in the configuration. The database system may be such as the database system 700, FIG. 7, and may be associated with a database management system (DBMS). The allotment may be maintained in the NV cache descriptor, such as the cache descriptor 740 in the NV cache metadata for "DB1" 755 on FIG. 7. A quota system table is persisted into the NV cache descriptor. The quota system table changes when new main memory caches are mapped to the NV cache, or earlier mapped main memory cache is increased in size, or when main memory caches are dropped. Different use cases for mappings between main memory caches and NV caches are described below.

Multiple Main Memory Caches are Mapped to a Single NV Cache

When a NV cache is created, the next process is to bind a database to the NV cache in the DBMS. During the binding operation, all the main memory caches having object of the database bound to the NV cache are iterated over and the caches size is collected. For example, there are 5 main memory caches having objects of the database as presented in Table 3.

TABLE 3

| Main memory caches | Size | Percentage |
|---|---|---|
| Cache 1 | 20 MB | 20% |
| Cache 2 | 30 MB | 30% |
| Cache 3 | 20 MB | 20% |
| Cache 4 | 20 MB | 20% |
| Cache 5 | 10 MB | 10% |

The NV cache may have a quota for the cache 1 defined by the percentage column. The size of the NV cache may be defined to comprise a specified number of pages. The quota may be applied to come up with the numbers of pages allocated for corresponding main memory caches. The quota may be change by changing the size of the caches mapped; by creating a new main memory cache; or by dropping an already mapped main memory cache. Whenever the quota is changed, the quota table will be updated, however the pages in the NV cache are not to be touched until a defined threshold is reached. The defined threshold may be associated with the NV cache or with a particular main memory cache. Allocation of pages to main memory caches is provided in Table 4 below.

TABLE 4

| CID-NV Map | | |
|---|---|---|
| CID | MAX PAGE | USED PAGE |
| 1 | 3000000 | 2000000 |
| 2 | 2000000 | 200050 |

TABLE 4-continued

CID-NV Map

| CID | MAX PAGE | USED PAGE |
|---|---|---|
| 5 | 1000000 | 300000 |
| 8 | 5500000 | 550100 |

While there is plenty of space in the NV cache, any cache can use more space than the allocated quota. However, when the NV cache threshold (90% of the NV cache size may be set as a default value) is reached, a background process (a garbage collection operation) may apply a quota rule. The background process may go through the quota table and mark the main memory caches, which have overused the NV cache. Then, the background process may replace the pages that are marked in the main memory caches from the defined LRU chain in the NV cache. A notice that a particular cache had over used limits may be generated and a delete operation may start. The pages from the main memory caches may be replaced from the LRU end of the LRU chain in the NV cache.

The background process may be such as a garbage collection operation that may get scheduled to operate late. When a page is not found in NV cache and the page is requested to be read from the hard disk storage for the database in the DBMS, if there is a notice that the NV cache threshold is reached, a synchronous replacement of a small subset of pages may be performed. In such manner the background process may be triggered.

Mapping of a Single Named Cache to Multiple NV Caches

When objects (tables or indexes) of multiple databases are bound to a single main memory cache CACHE1, then the single main memory cache may map to multiple NV caches (one per database). For example, if there are 5 tables from different databases bound to a single main memory cache, the quota table may be such as Table 5.

TABLE 5

| Table | Cache size | Cache size to be considered |
|---|---|---|
| Table 1 (DB1) | 100 MB | 20 MB |
| Table 2 (DB2) | 100 MB | 20 MB |
| Table 3 (DB3) | 100 MB | 20 MB |
| Table 4 (DB4) | 100 MB | 20 MB |
| Table 5 (DB5) | 100 MB | 20 MB |

Further, if for database DB1, the remaining objects of the DB1 are bound to CACHE2, the quota percentage for its NV cache may be such as the exemplary percentages provided in Table 6.

TABLE 6

| Named caches | Size | Percentage |
|---|---|---|
| CACHE1 | 20 MB | 16.7% |
| CACHE2 | 100 MB | 83.3% |

In such case, the quota for the caches will change, when there is a change in the number of tables bound to the CACHE1, or if CACHE1 and CACHE2 are dropped or increased in size.

Mapping of Many Main Memory Caches to Multiple NV Caches

Such a mapping is a combination of the above-described mappings. The loose quota system provides a very flexible way of configuring the main memory caches and the NV cache. The background process may work on the quota table only when the NV cache threshold is reached. Such a behavior may be configurable.

Background Process

When new/updated pages are written to main memory cache, then the new/updated pages are written on the NV storage. Then, the new/updated pages are to be written to the DB storages in a delayed fashion by the background process.

A background task for transferring content from the NV cache to the NV storage may be added into the DBMS. The definition of the background task may be associated with the definition of the NV cache as an intermediate layer for caching for databases. The responsibility of the background task is to clean up the cached data from the NV cache in order to maintain "healthy" caches. The definition of a "healthy" cache may be implied in the mere cache configuration and definition of cache size and associated rules for caching and managing cached information.

In one embodiment, an NV cache may be configured to be associated with a dirty threshold for a cache ratio. The cache ratio may be a numeric value, for example in a percentage value. The cache ratio may be defined as a quotient of the number of buffers to be linked into a dirty chain and the total number of buffers defined for the NV cache. A default ratio rate may be set up to 50%. The ratio may increase when the buffers for pages, reflected by page write operations or with a page replacement operation, also increase. The background process cleans the buffers in the NV cache metadata to bring them down and to correspond to the defined dirty threshold for the cache ratio, as defined for the NV cache. For example, a wash deficit may be determined as the number of buffers in the dirty chain minus the calculated threshold value of number of buffers in dirty chain. The calculated threshold value is determined by the configured percentage ratio of total number of buffers to be present in dirty chain and total number of buffers in cache. If the wash deficit is determined to be higher than 0, then an iteration over the buffers in the dirty chain is performed. "N" pages from an NV cache storage are read and a write operation is performed for those "N" pages on the hard disk drive storage associated with the database bound to the NV cache storage. The iterations are performed until the number that equals the wash deficit correspond to the number of pages that are been "cleaned". The read pages are written back on the hard disk drive storage associated with the database. The number "N" of pages that are read from the NV cache may be configured for the background process, and may vary, for example based on user preferences, or optimization criteria.

In one embodiment, the defined processes as presented in FIGS. 8A, 8B, 8C, 9, 10, 11, 12A, 12B, and 12C may be associated with performing actions on elements of a DBMS, where an NV cache is configured as an intermediated layer of caching. The performed actions may be associated with elements as presented on the system diagram on FIG. 7.

Figure 8A:
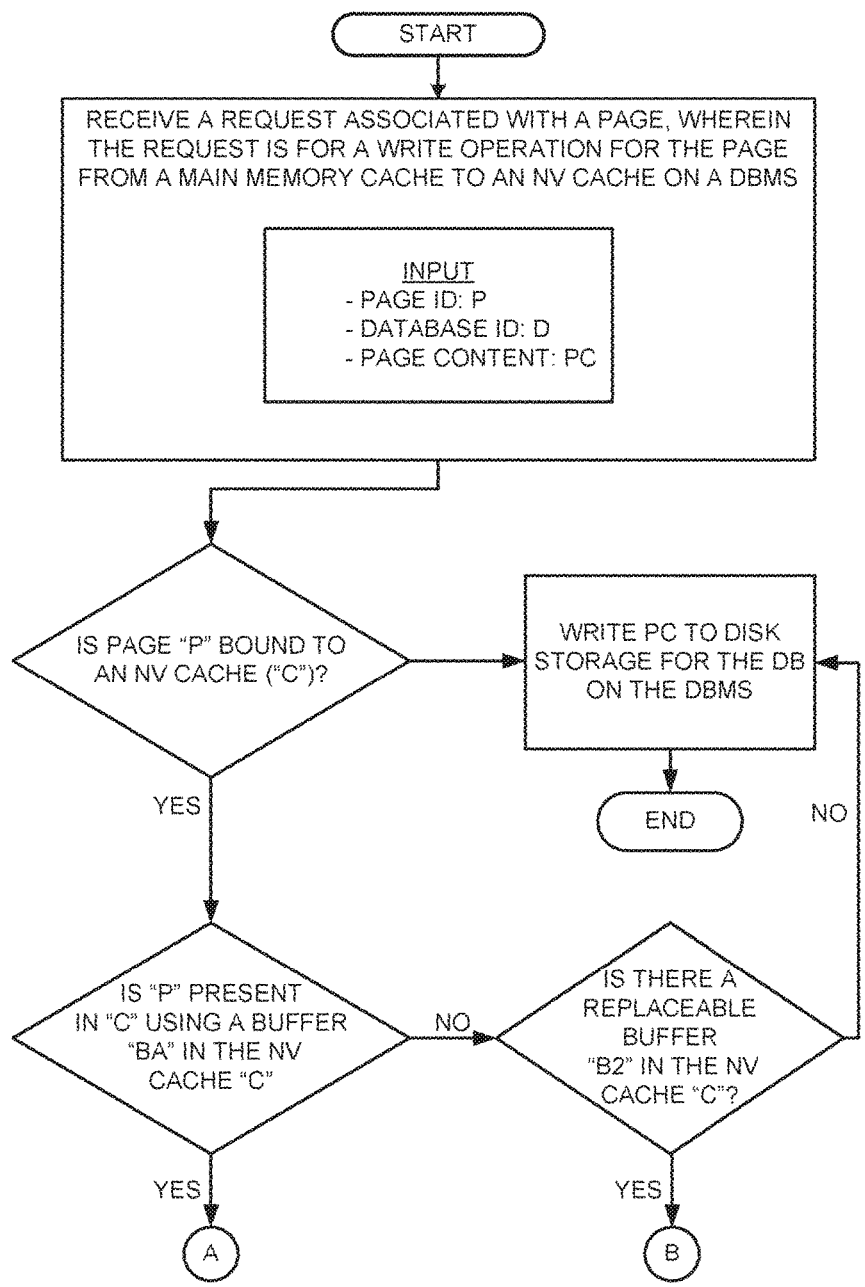
FIGS. 8A-8C are flow diagrams illustrating a process for performing a page write operation from a main memory cache to an NV cache configured on a database system, according to an example embodiment.
Figure 8B:
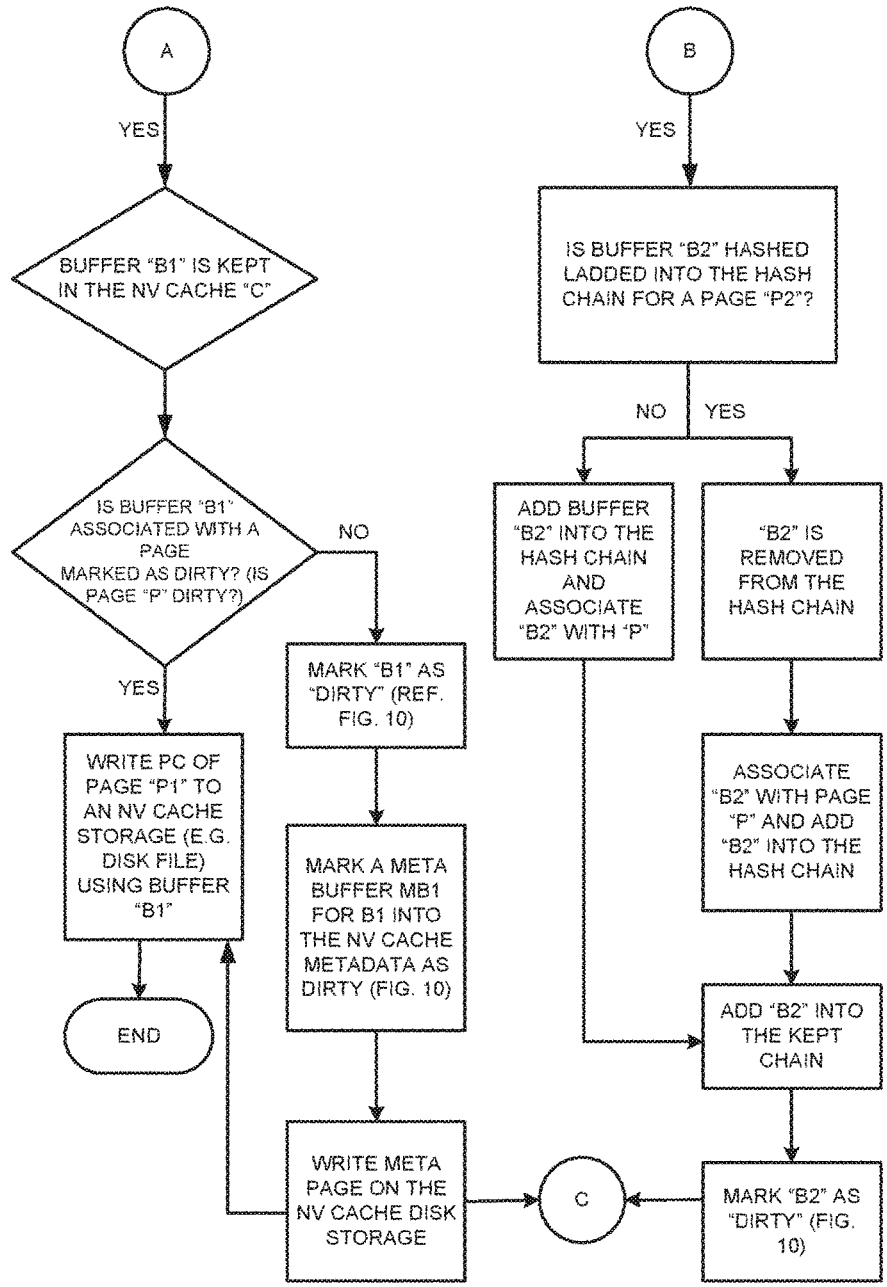
Figure 8C:
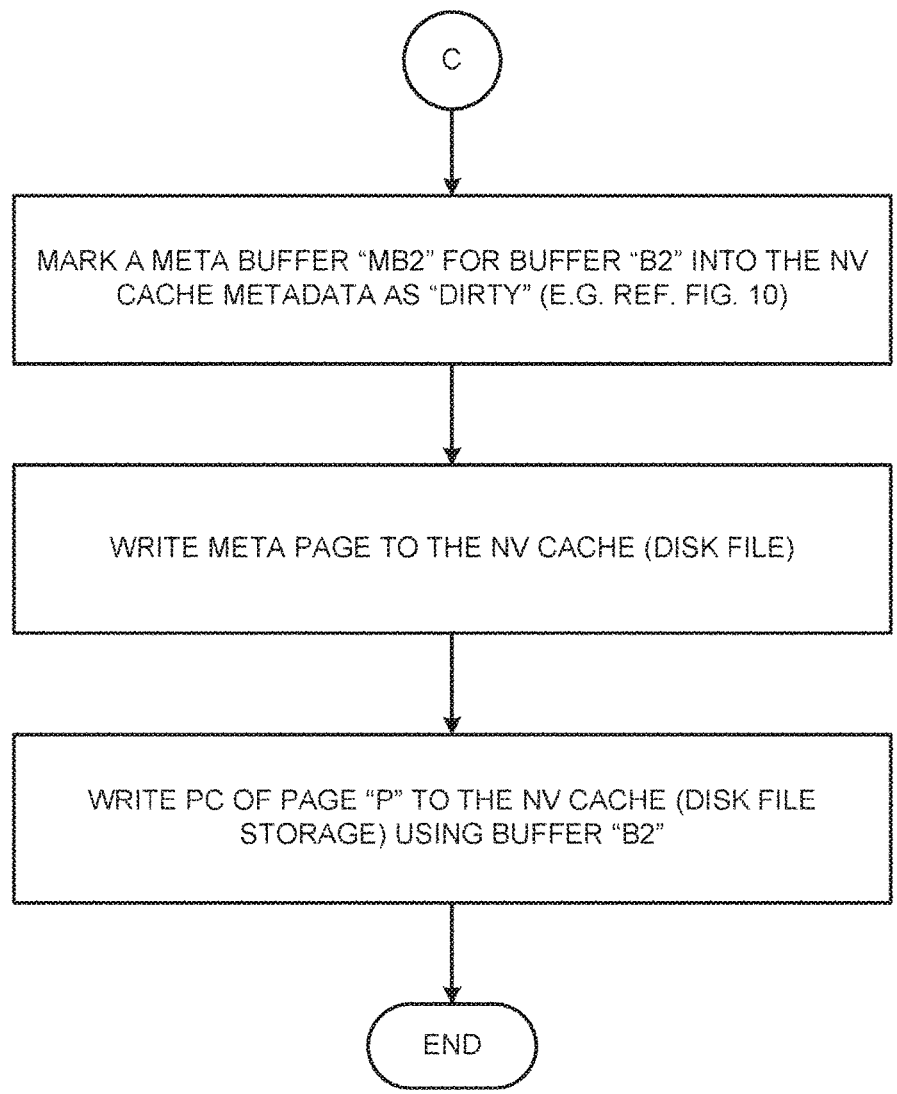

FIGS. 8A-8C are flow diagrams illustrating a process for performing a page write operation from a main memory cache to an NV cache configured on a DBMS, according to an example embodiment. FIGS. 8A-8C include blocks defining steps to be performed on the DBMS in relation to a page write operation. The steps are described in instruction blocks (associated with performing a task) and decision block corresponding to the steps. The process takes an input defining a page associated with a request. The page is defined with a page ID, denoted as "P". The input also includes an ID of a DB, which includes the requested page "P". Also, page content "PC" is provided in the input for the process.

Figure 9:
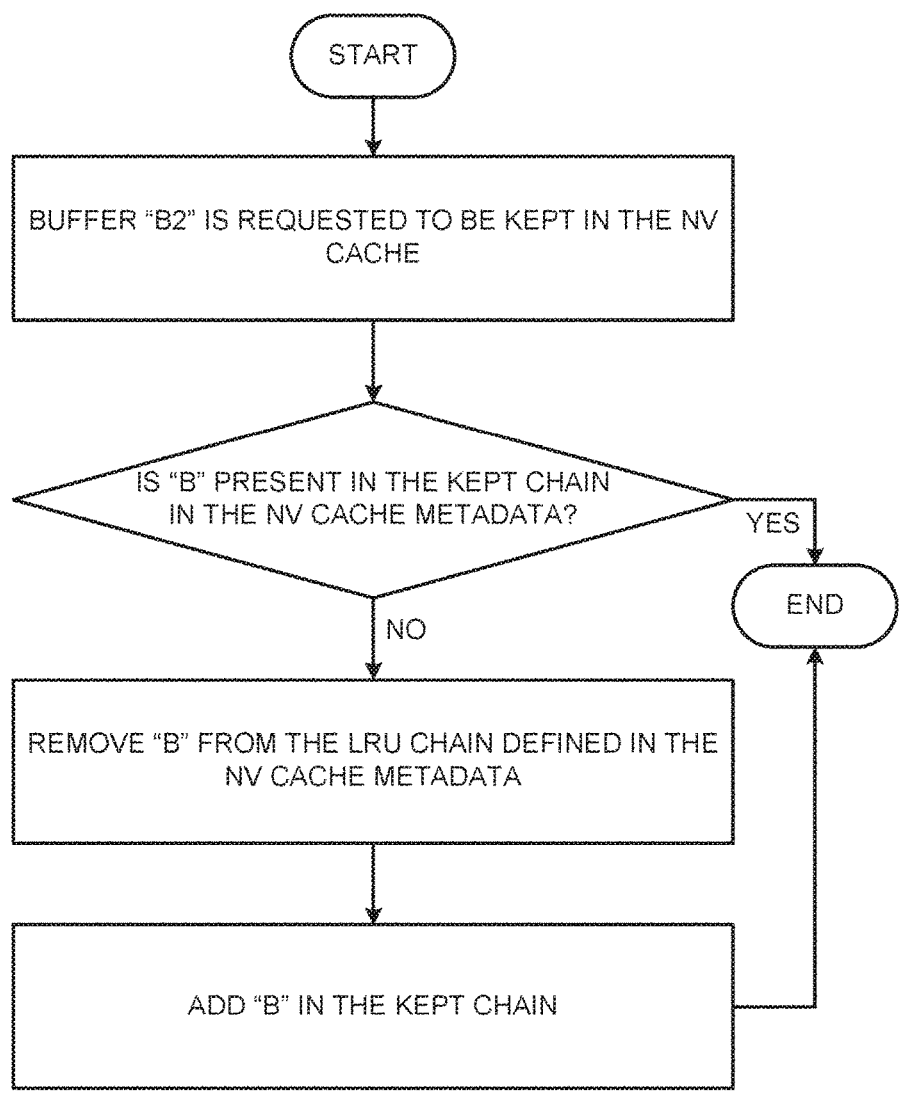
FIG. 9 is a flow diagram illustrating a process for keeping a requested buffer in a configured NV cache on a database system, according to an example embodiment.

FIG. 9 is a flow diagram illustrating a process for keeping a requested buffer in a configured NV cache on a DBMS, according to an example embodiment. FIG. 9 defines steps in blocks, including instruction blocks (associated with performing a task) and decision blocks. The process starts when a request to keep a particular buffer in the configured NV cache is received. The requests may be triggered during other processes performed in relation to caching data on the DBMS, where the NV cache is configured as an intermediate layer for caching data.

Figure 10:
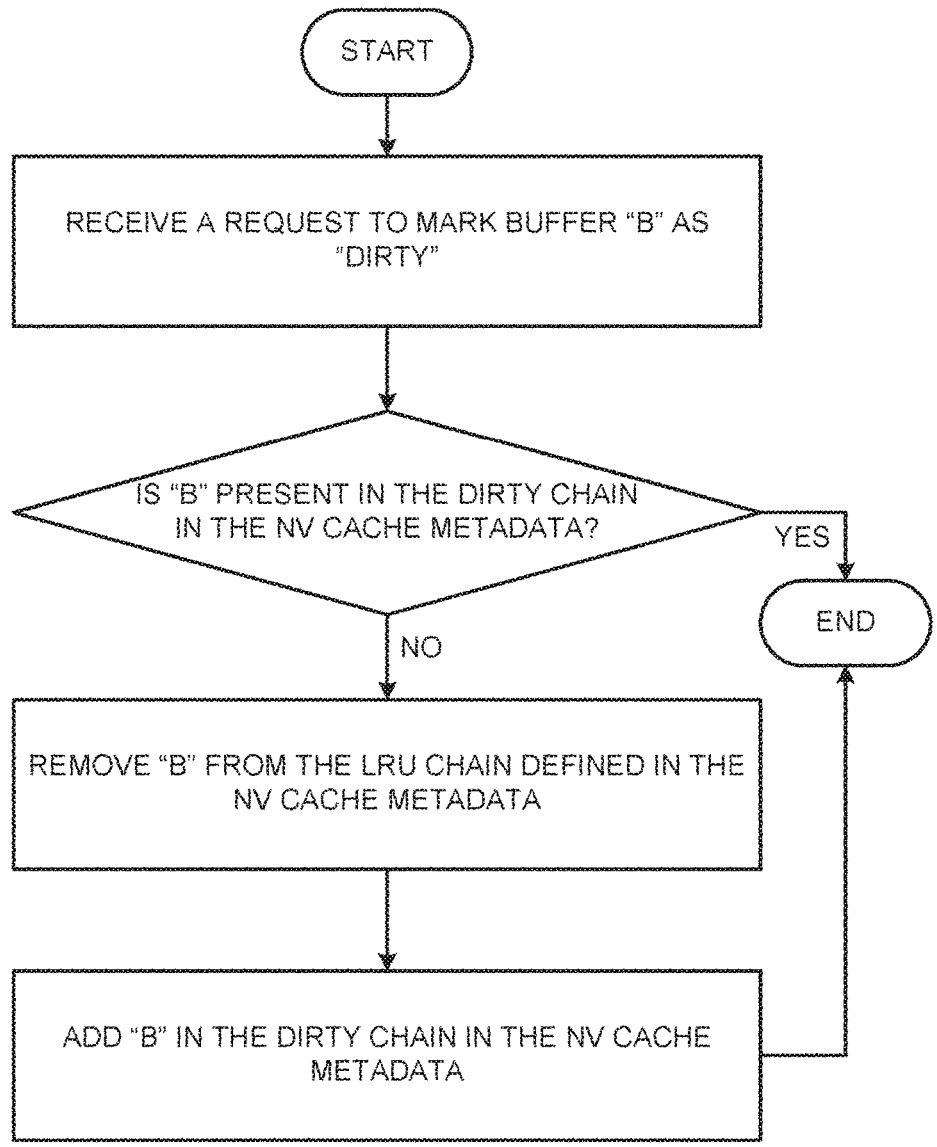
FIG. 10 is a flow diagram illustrating a process for marking a buffer in an NV metadata cache, part of a configured NV cache on a database system, as dirty, according to an example embodiment.

FIG. 10 is a flow diagram illustrating a process for marking a buffer in an NV metadata cache, part of a configured NV cache on a DBMS, as dirty, according to an example embodiment. FIG. 10 defines steps defined in blocks, including instruction block (associated with performing a task) and decision blocks. The process starts when a request to mark a particular buffer in the configured NV cache as "dirty" is received. The requests may be triggered during other processes performed in relation to caching on the DBMS, where the NV cache is configured as an intermediate layer for caching.

Figure 11:
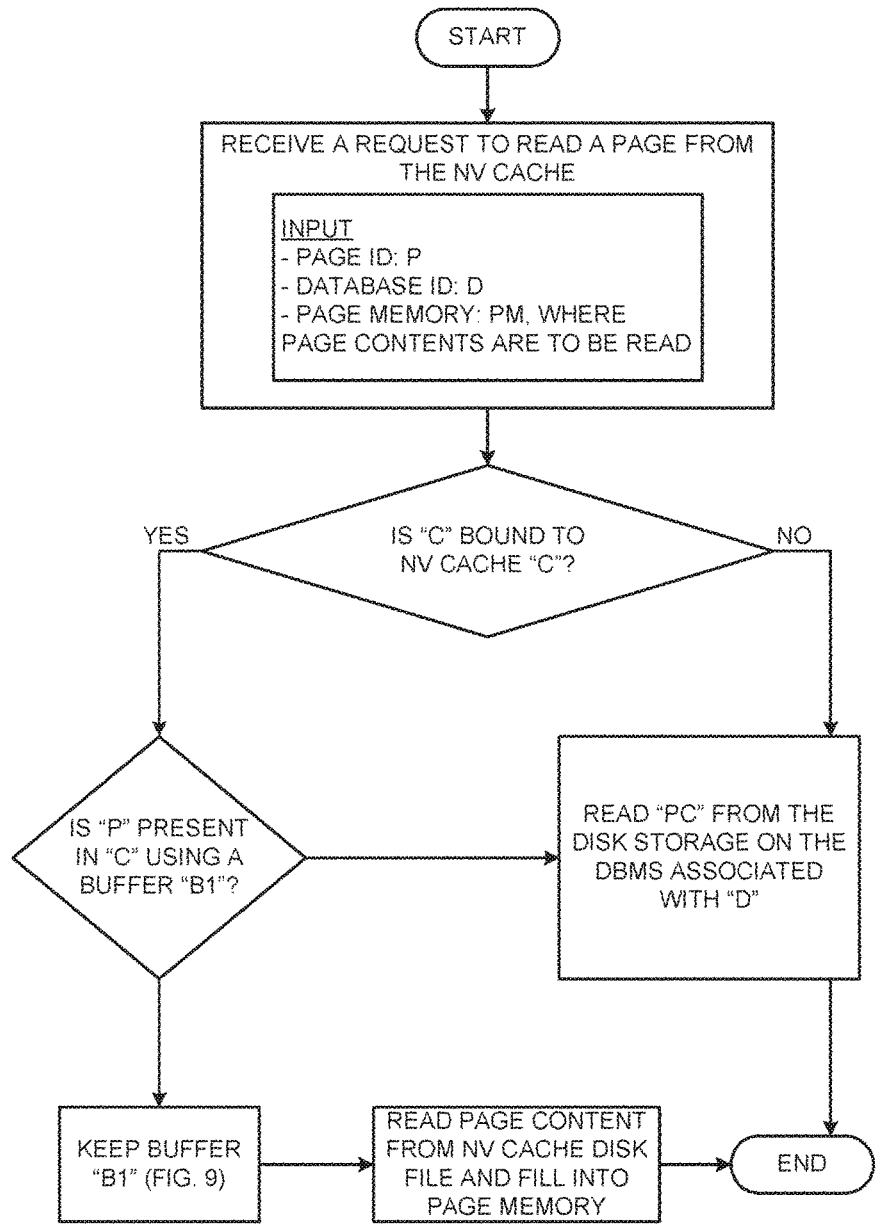
FIG. 11 is a flow diagram illustrating a process for reading a page from a configured NV cache, according to an example embodiment.

FIG. 11 is a flow diagram illustrating a process for reading a page from a configured NV cache, according to one embodiment. FIG. 11 includes blocks defining steps to be performed on the DBMS in relation to a page read operation. The steps are described in instruction blocks (associated with performing a task) and decision block corresponding to the steps. The process takes an input defining a page associated with a request to read the page. The page is defined with a page ID, denoted as "P". The input also includes an ID of a DB, which includes the requested page "P". Also, page memory "PM" is provided in the input for the process. The "PM" defines where page content is about to be read.

Figure 12A:
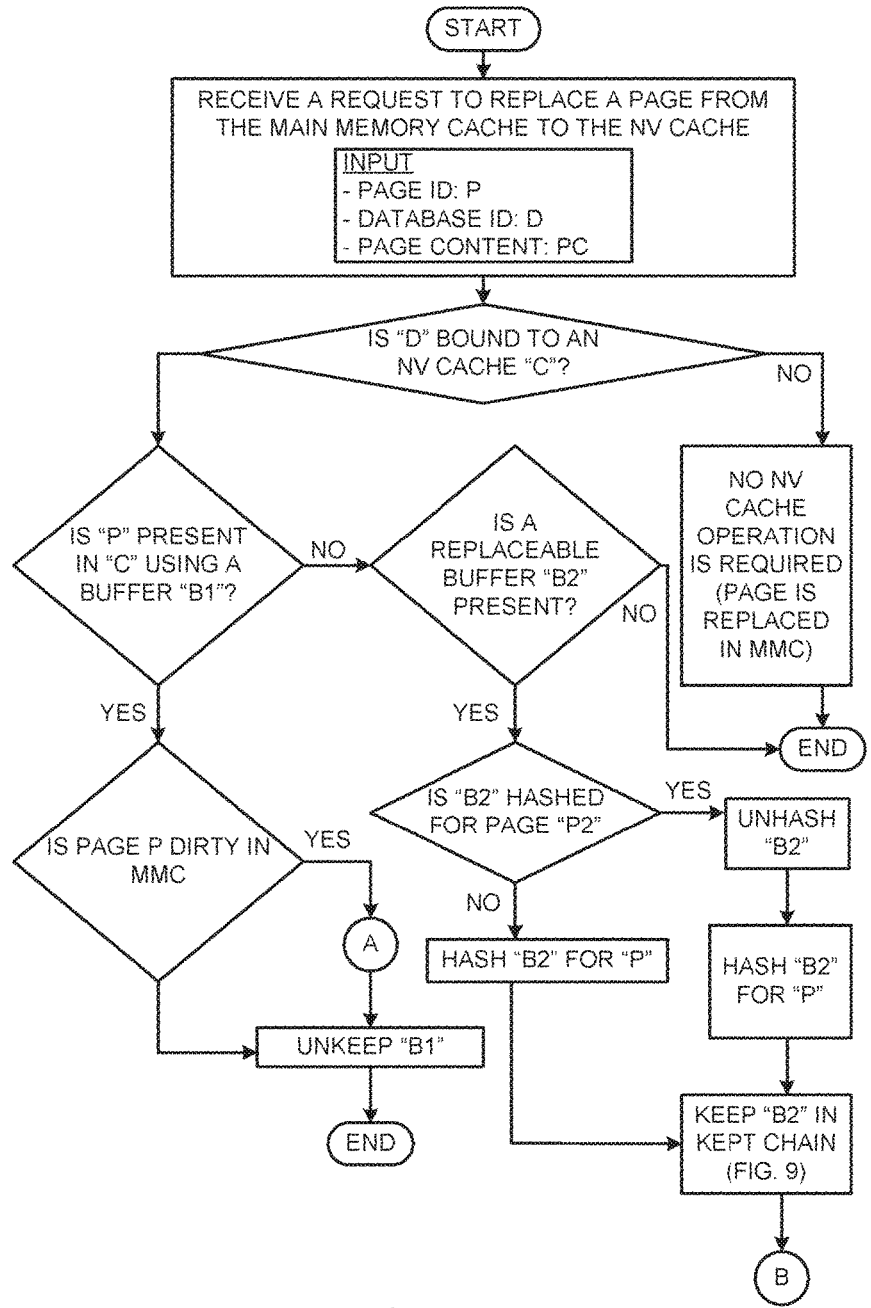
FIGS. 12A-12C are flow diagrams illustrating a process for page replacement from a main memory cache to a configured NV cache on a database system, according to an example embodiment.
Figure 12B:
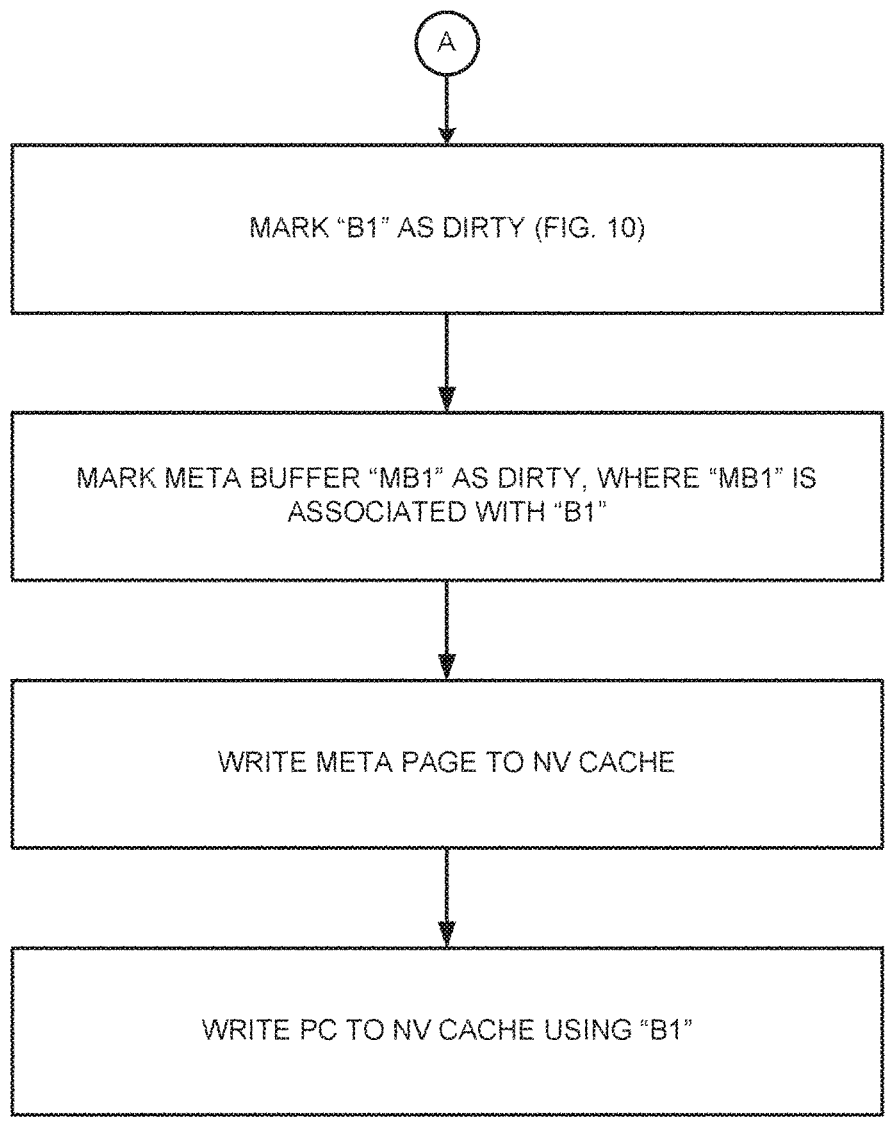
Figure 12C:
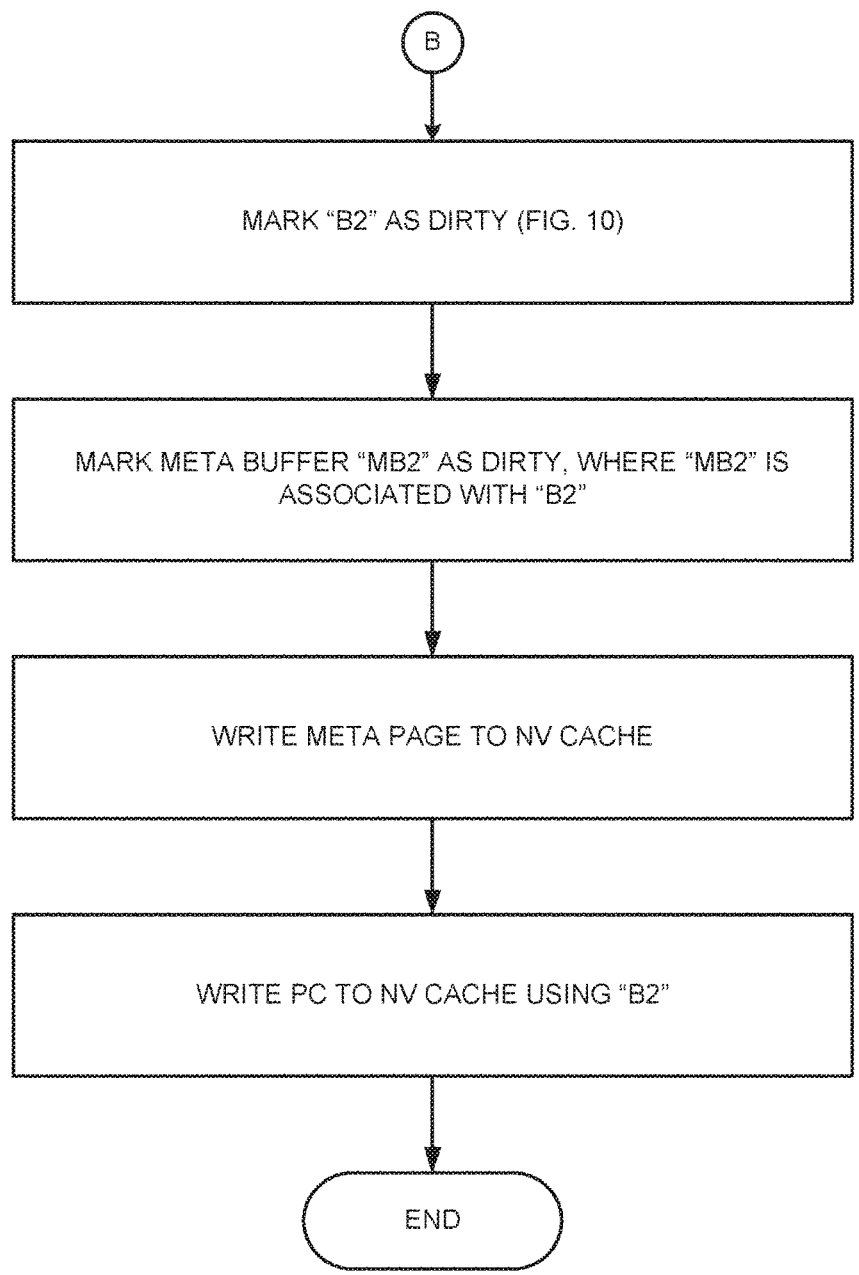

FIGS. 12A-12C are flow diagrams illustrating a process for page replacement from a main memory cache to a configured NV cache on a DBMS, according to an example embodiment. FIG. 12A-12C includes blocks defining steps to be performed on the DBMS in relation to a page replacement operation. The steps are described in instruction blocks (associated with performing a task) and decision block corresponding to the steps. The process takes an input defining a page associated with the request to replace the page from the main memory cache to the NV cache. The page is defined with a page ID, denoted as "P". The input also includes an ID of a DB, which includes the requested page "P". Also, page content "PC" is provided in the input for the process. The PC defines where page content that is about to be written on the NV cache.

Example 1

A computer implemented method for caching data in a database system, the method comprising:
at a non-volatile cache memory layer, receiving a request for performing an operation on content stored in a first database of the database system, the content of the database being associated with a page of a plurality of pages;
identifying the page associated with the requested content; and
based on the identification, performing a caching operation on the non-volatile cache memory layer associated with the requested operation, wherein the performing is based on an evaluation of metadata associated with the identified page stored in a non-volatile metadata cache of the non-volatile cache memory layer.

Example 2

The method of example 1 further comprising:
generating a first stored procedure for configuring the non-volatile cache memory layer as an intermediate layer for caching on the database system;
configuring the non-volatile cache memory layer for caching pages for a set of databases on the database system through invoking the first stored procedure, wherein the first stored procedure is persisted on the database system, and wherein when invoking the first stored procedure, an identification of a section of a main memory cache from the database system and information about a non-volatile cache disk device part of the non-volatile cache memory layer are provided as input for the configuration.

Example 3

The method of examples 1 and/or 2, further comprising:
binding a first section of the non-volatile cache memory layer to the first database though through invoking a second stored procedure persisted on the database system;
configuring one or more non-volatile cache memory parameters for the first section, wherein the first section comprises a first metadata section included in the non-volatile metadata cache, and wherein the first metadata section comprises metadata for cached pages from the first database; and
associating the first section to a first section of a main memory cache on the database system, wherein the page associated with the requested content is cached on the main memory cache.

Example 4

The method of examples 1 and/or 2, and/or 3, wherein performing the caching operation associated with the requested operation by the non-volatile cache memory layer further comprises:
identifying the first section to correspond to the identified page;
evaluating metadata stored for the identified page, wherein the stored metadata is in a metadata section from the first identified section of the non-volatile cache memory layer; and
storing new data associated with the requested operation on the non-volatile cache memory layer.

Example 5

The method of examples 1 and/or 2, and/or 3, and/or 4, wherein storing the new data associated with the requested operation comprises:
storing new page metadata to update the metadata stored for the page on the first section of the non-volatile metadata cache.
storing new page content provided through the request on a non-volatile disk device part of the non-volatile cache memory layer, when the request is associated with amending previously stored content for the page on the database system.

Example 6

The method of examples 1 and/or 2, and/or 3, and/or 4, and/or 5, wherein the stored new page metadata points to a location where the identified page is stored on the non-volatile disk device part of the non-volatile cache memory layer.

Example 7

The method of examples 1 and/or 2, and/or 3, and/or 4, and/or 5, and/or 6, further comprising:
defining buffers within the first metadata section for managing the metadata;
defining a set of buffer chains in the first metadata section to correspondingly comprise one or more buffers from the defined buffers, wherein a buffer from a buffer chain is associated with a cached page from a database from the set of databases; and
wherein storing the new page metadata to update the metadata stored for the page on the first section of the non-volatile metadata cache further comprises:
associating a buffer from the defined buffers with the identified page associated with the requested operation, wherein the buffer points to the location where the identified page is stored; and
determining at least one buffer chain from the set of buffer chains that includes the buffer associated with the page, based on evaluating the requested operation.

Example 8

The method of examples 1 and/or 2, and/or 3, and/or 4, and/or 5, and/or 6, and/or 7, further comprising:
triggering a background process for transferring the new page content from the non-volatile disk space layer to a hard disk storage allocated for the first database on the database system, when a predefined threshold for a cache ration for the first section of the non-volatile cache memory layer is reached, wherein the cache ratio is defined as a ration between a number of buffers related to page with altered content and a number of defined buffers in the first metadata section.

Example 9

A computer system to cache data in a database system, the system comprising:
one or more processors;
a set of databases on the database system;
a main memory cache storage;
master database tables for storing configuration details associated with defining a intermediate non-volatile cache memory layer; and
a memory in association with the one or more processors storing instructions related to:
method steps from methods of examples 1 and/or 2, and/or 3, and/or 4, and/or 5, and/or 6, and/or 7, and/or 8.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 13:
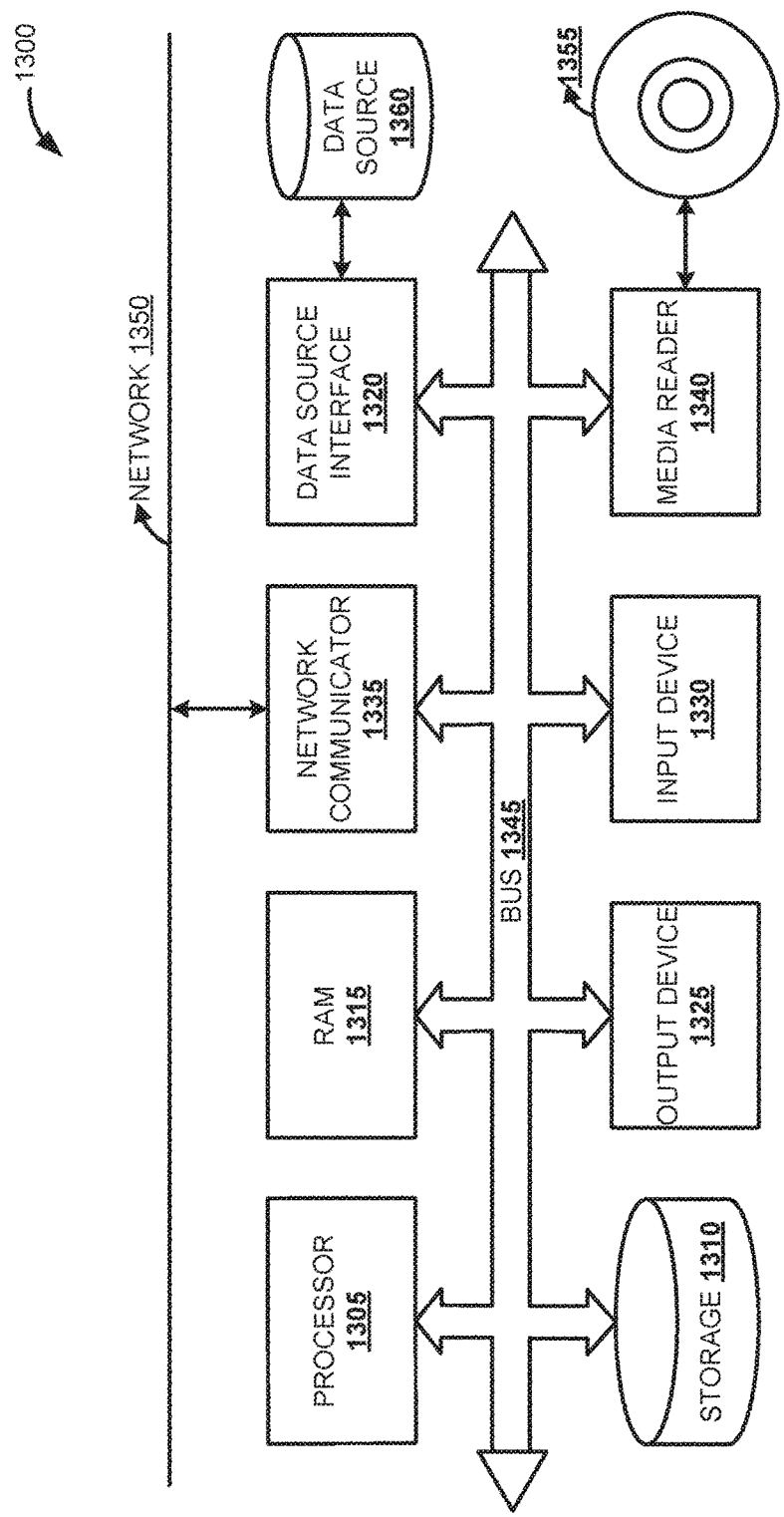
FIG. 13 is a block diagram illustrating an embodiment of a computing environment in which the techniques described for configuring an NV cache memory layer in a database system, can be implemented.

FIG. 13 is a block diagram of an exemplary computer system 1300. The computer system 1300 includes a processor 1305 that executes software instructions or code stored on a computer readable storage medium 1355 to perform the above-illustrated methods. The processor 1305 can include a plurality of cores. The computer system 1300 includes a media reader 1340 to read the instructions from the computer readable storage medium 1355 and store the instructions in storage 1310 or in random access memory (RAM) 1315. The storage 1310 provides a large space for keeping static data where at least some instructions could be stored for later execution. According to some embodiments, such as some in-memory computing system embodiments, the RAM 1315 can have sufficient storage capacity to store much of the data required for processing in the RAM 1315 instead of in the storage 1310. In some embodiments, all of the data required for processing may be stored in the RAM 1315. The stored instructions may be further compiled to generate other representations of the instructions and dynamically stored in the RAM 1315. The processor 1305 reads instructions from the RAM 1315 and performs actions as instructed. According to one embodiment, the computer system 1300 further includes an output device 1325 (e.g., a display) to provide at least some of the results of the execution as output including, but not limited to, visual information to users and an input device 1330 to provide a user or another device with means for entering data and/or otherwise interact with the computer system 1300. Each of these output devices 1325 and input devices 1330 could be joined by one or more additional peripherals to further expand the capabilities of the computer system 1300. A network communicator 1335 may be provided to connect the computer system 1300 to a network 1350 and in turn to other devices connected to the network 1350 including other clients, servers, data stores, and interfaces, for instance. The modules of the computer system 1300 are interconnected via a bus 1345. Computer system 1300 includes a data source interface 1320 to access data source 1360. The data source 1360 can be accessed via one or more abstraction layers implemented in hardware or software. For example, the data source 1360 may be accessed by network 1350. In some embodiments the data source 1360 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system including a database system, the system comprising:
   at least one processor;
   a set of database storage devices for the database system, the set of database storage devices being volatile memory storage devices;
   at least one main memory cache storage device defining a cache area for the set of database storage devices;
   master database tables for storing configuration details defining an intermediate non-volatile cache memory layer; and
   a memory in communication with the at least one processor storing program instructions, the at least one processor operative with the program instructions to:
   configure, based on the configuration details, an intermediate non-volatile cache memory layer for caching pages of a set of databases stored on the set of database storage devices of the database system, the intermediate non-volatile cache memory layer being configured to communicate with the at least one main memory cache storage device and the set of database storage devices and includes an in-memory non-volatile metadata cache portion to store metadata associated with a database page and a non-volatile disk portion to persist corresponding data of the database page, the in-memory non-volatile metadata cache and the non-volatile disk portion of the intermediate non-volatile cache memory layer being separate and distinct from each other;
   receive, at the intermediate non-volatile cache memory layer, a request associated with the at least one main memory storage device to execute an operation on content stored in a first database of the set of databases, the content being associated with a first page of a plurality of database pages;
   identify the first page associated with the requested content; and
   execute a caching operation on the intermediate non-volatile cache memory layer for the requested operation, the execution of the requested operation being based on an evaluation of metadata associated with the identified first page stored in the in-memory non-volatile metadata cache of the intermediate non-volatile cache memory layer.

2. The system of claim 1, wherein the at least one processor is further operative with the program instructions to generate a first stored procedure for configuring the intermediate non-volatile cache memory layer.

3. The system of claim 1, wherein the configuring of the intermediate non-volatile cache memory layer is performed by invoking the first stored procedure, the first stored procedure including the configuration details.

4. The system of claim 1, wherein the in-memory non-volatile metadata cache comprises data structure buffers to store metadata associated with a database page.

5. The system of claim 1, wherein the metadata associated with a database page stored in the in-memory non-volatile metadata cache points to a location where the database page is stored on the non-volatile disk portion of the intermediate non-volatile cache memory layer.

6. The system of claim 1, wherein the intermediate non-volatile cache memory layer is independent of the at least one main memory cache storage device.

7. A computer-implemented method, the method comprising:
configuring, by a processor based on configuration details, an intermediate non-volatile cache memory layer for caching pages of a set of databases stored on a set of database storage devices of a database system, the intermediate non-volatile cache memory layer being configured to communicate with at least one main memory cache storage device and the set of database storage devices and includes an in-memory non-volatile metadata cache portion to store metadata associated with a database page and a non-volatile disk portion to persist corresponding data of the database page, the in-memory non-volatile metadata cache and the non-volatile disk portion of the intermediate non-volatile cache memory layer being separate and distinct from each other;
receiving, at the intermediate non-volatile cache memory layer, a request associated with the at least one main memory storage device to execute an operation on content stored in a first database of the set of databases, the content being associated with a first page of a plurality of database pages;
identifying, by the processor, the first page associated with the requested content; and
executing, by the processor, a caching operation on the intermediate non-volatile cache memory layer for the requested operation, the execution of the requested operation being based on an evaluation of metadata associated with the identified first page stored in the in-memory non-volatile metadata cache of the intermediate non-volatile cache memory layer.

8. The method of claim 7, further comprising generating a first stored procedure for configuring the intermediate non-volatile cache memory layer.

9. The method of claim 7, wherein the configuring of the intermediate non-volatile cache memory layer is performed by invoking a first stored procedure, the first stored procedure including the configuration details.

10. The method of claim 7, wherein the in-memory non-volatile metadata cache comprises data structure buffers to store metadata associated with a database page.

11. The method of claim 7, wherein the metadata associated with a database page stored in the in-memory non-volatile metadata cache points to a location where the database page is stored on the non-volatile disk portion of the intermediate non-volatile cache memory layer.

12. The method of claim 7, wherein the intermediate non-volatile cache memory layer is independent of the at least one main memory cache storage device.

13. A non-transitory computer-readable medium storing program instructions thereon, the medium comprising:
instructions to configure, based on configuration details, an intermediate non-volatile cache memory layer for caching pages of a set of databases stored on a set of database storage devices of a database system, the intermediate non-volatile cache memory layer being configured to communicate with at least one main memory cache storage device and the set of database storage devices and includes an in-memory non-volatile metadata cache portion to store metadata associated with a database page and a non-volatile disk portion to persist corresponding data of the database page, the in-memory non-volatile metadata cache and the non-volatile disk portion of the intermediate non-volatile cache memory layer being separate and distinct from each other;
instructions to receive, at the intermediate non-volatile cache memory layer, a request associated with the at least one main memory storage device to execute an operation on content stored in a first database of the set of databases, the content being associated with a first page of a plurality of database pages;
instructions to identify the first page associated with the requested content; and
instructions to execute a caching operation on the intermediate nonvolatile cache memory layer for the requested operation, the execution of the requested operation being based on an evaluation of metadata associated with the identified first page stored in the in-memory non-volatile metadata cache of the intermediate non-volatile cache memory layer.

14. The medium of claim 13, further comprising instructions to generate a first stored procedure for configuring the intermediate non-volatile cache memory layer.

15. The medium of claim 13, wherein the configuring of the intermediate non-volatile cache memory layer is performed by invoking a first stored procedure, the first stored procedure including the configuration details.

16. The medium of claim 13, wherein the in-memory non-volatile metadata cache comprises data structure buffers to store metadata associated with a database page.

17. The medium of claim 13, wherein the metadata associated with a database page stored in the in-memory non-volatile metadata cache points to a location where the database page is stored on the non-volatile disk portion of the intermediate non-volatile cache memory layer.

* * * * *